(12) United States Patent
Sun et al.

(10) Patent No.: US 9,045,356 B2
(45) Date of Patent: Jun. 2, 2015

(54) SEWAGE TREATMENT PROCESS AND SYSTEM

(75) Inventors: Youfeng Sun, Beijing (CN); Jue Qian, Beijing (CN)

(73) Assignee: Youfeng Sun, Beijing (CN)

( * ) Notice: Subject to any disclaimer, the term of this patent is extended or adjusted under 35 U.S.C. 154(b) by 669 days.

(21) Appl. No.: 13/262,560

(22) PCT Filed: May 26, 2009

(86) PCT No.: PCT/CN2009/071982
§ 371 (c)(1),
(2), (4) Date: Sep. 30, 2011

(87) PCT Pub. No.: WO2010/115319
PCT Pub. Date: Oct. 14, 2010

(65) Prior Publication Data
US 2012/0018374 A1  Jan. 26, 2012

(30) Foreign Application Priority Data
Apr. 9, 2009 (CN) .......................... 2009 1 0081502

(51) Int. Cl.
*C02F 3/30* (2006.01)
*C02F 3/12* (2006.01)

(52) U.S. Cl.
CPC ............... *C02F 3/301* (2013.01); *C02F 3/1215* (2013.01); *C02F 3/1273* (2013.01); *C02F 3/308* (2013.01);
(Continued)

(58) Field of Classification Search
CPC ............. C02F 2209/42; C02F 2209/44; C02F 3/1215; C02F 3/301; C02F 3/1263; C02F 3/308; C02F 3/1273
USPC ......... 210/605, 622, 630, 631, 903, 906, 252, 210/259
See application file for complete search history.

(56) References Cited

U.S. PATENT DOCUMENTS 5,942,108 A * 8/1999 Yang .......................... 210/195.3
7,147,778 B1  12/2006 DiMassimo et al.
(Continued)

FOREIGN PATENT DOCUMENTS

CN   1424265   6/2003
CN   1807276   2/2006
(Continued)

OTHER PUBLICATIONS

Machine-generated English translation of CN 1807276, 5 pages, dated Mar. 8, 2014.*

*Primary Examiner* — Fred Prince
(74) *Attorney, Agent, or Firm* — Boyle Fredrickson S.C.

(57) ABSTRACT

A sewage treatment process is provided, which includes the following steps: a) sewage feeding step, comprising introducing raw sewage into a biological reaction tank (1) to a predetermined time or liquid level; b) reaction step comprising performing aeration and stirring intermittently in the biological reaction tank (1); c) treated water discharging step, comprising performing solid-liquid separation of the mixed liquid in the biological reaction tank (1) by a membrane separation device (2) to obtain a first permeate, which is taken as the final treated water; d) standby step comprising stopping aeration in the biological reaction tank (1); and e) phosphorus-enriched water discharging step, comprising keeping anaerobic condition in the biological reaction tank (1) and performing solid-liquid separation of the mixed liquid in the biological reaction tank (1) by a membrane separation device (2) to obtain a second permeate, the second permeate entering inside a phosphorus recycling unit (5) which is set independent from the biological reaction tank (1), the phosphorus recycling unit (5) removing phosphorus from water, the second permeate becoming low-phosphorus water, and the low-phosphorous water flowing back to the biological reaction tank (1); the sewage treatment process runs in cycle by repeating above steps. A corresponding treatment system is also provided.

18 Claims, 8 Drawing Sheets

(52) U.S. Cl.
CPC ......... *C02F 2209/42* (2013.01); *C02F 2209/44* (2013.01); *C02F 3/1263* (2013.01); *Y10S 210/906* (2013.01)

(56) References Cited

U.S. PATENT DOCUMENTS

| | | |
|---|---|---|
| 2002/0117444 A1 | 8/2002 | Mikkelson |
| 2004/0206699 A1* | 10/2004 | Ho et al. ................ 210/605 |
| 2007/0108125 A1* | 5/2007 | Cho et al. ............... 210/605 |
| 2007/0144965 A1* | 6/2007 | Morris et al. ........... 210/605 |
| 2008/0314829 A1* | 12/2008 | Zha et al. ................ 210/614 |
| 2009/0301963 A1* | 12/2009 | Brockmann et al. ..... 210/601 |
| 2009/0308807 A1* | 12/2009 | Chung et al. ............ 210/603 |

FOREIGN PATENT DOCUMENTS

| | | |
|---|---|---|
| CN | 101277905 | 10/2008 |
| EP | 1293484 | 3/2003 |
| EP | 1647530 | 4/2006 |
| GB | 2436426 | 9/2007 |
| JP | 2008188498 | 8/2008 |

* cited by examiner

SEWAGE TREATMENT PROCESS AND SYSTEM

This application claims priority to Chinese Patent Application No. 200910081502.0 filed with the State Chinese Intellectual Property Office of China on Apr. 9, 2009, entitled "PROCESS AND SYSTEM FOR TREATING SEWAGE", which is hereby incorporated by reference.

FIELD OF THE INVENTION

The present invention relates to a sewage treatment process and system, which is particularly suitable for treating municipal sewage, pertaining to the field of water treatment technology.

BACKGROUND ART

Eutrophication, which is mainly caused by the excessive emission of nutrients such as nitrogen, phosphorus and the like into the environment, is becoming a more and more serious, global environmental problem. As a result, the countries in the world are all upgrading the sewage discharge standard thereof. According to standard A in Level I standard in the current national standard Discharge Standard of Pollutants for Municipal Sewage Treatment Plant (GB 18918-2002), the amount of discharged ammonia nitrogen shall not exceed 5 mg/L (not higher than 8 mg/L at low temperature), total nitrogen (TN) shall not exceed 15 mg/L, and total phosphorus (TP) should not exceed 0.5 mg/L. At present, it is mandatory that the Standard should be strictly enforced when a new sewage treatment facility is established in a river basin or area where water is seriously polluted or higher water quality is required. Currently operated two-stage sewage treatment plants mainly aiming to remove carbonaceous organic materials should be also upgraded and rebuilt gradually, so that the discharged water can meet the requirements stated in the Standard.

Due to relatively low concentration of nitrogen and phosphorus in municipal sewage and huge discharge of sewage, the removal of nitrogen and phosphorus by merely using physical and chemical methods has significant disadvantages of large amount of dosage, large amount of chemical precipitate, and high operation cost, and is seldom adopted in practical sewage treatment projects. The technology of biological nutrient removal (BNR) utilizing a principle of biological nitrogen and phosphorus removal is the major technology adopted in the field of nitrogen and phosphorus removal from municipal sewage at present.

The principle of conventional biological nitrogen removal can be briefed as: (1) firstly, the organic nitrogen, protein nitrogen and the like existing in sewage is converted into ammonia nitrogen by ammonifiers, and then converted into nitrate nitrogen by nitrobacteria under aerobic conditions (this stage is called aerobic nitrification). (2) the nitrate nitrogen is reduced to nitrogen gas by denitrifying bacteria under anoxic conditions using the energy provided by a carbon source, and then escaped from water (this stage is called anoxic denitrification). Nitrification and denitrification are two separate processes involving in two different kinds of microbes. Generally the two processes can not happen at the same time, but can happen sequentially in terms of space or time, since they require different environmental conditions. In a biological nitrogen removal system, nitrobacteria require an aerobic environment, grow in slow speed, and have a sludge age (or biological solids retention time, SRT) of generally no less than 30 days. The denitrifying bacteria generally grow under an anoxic condition, and require sufficient carbon source to provide energy, and the denitrification requires that the ratio of $BOD_5$ (five day biochemical oxygen demand) to TKN (total Kjeldahl nitrogen) is 5-8, otherwise, the denitrification can not happen smoothly unless additional carbon source is provided.

The conventional principle of phosphorus removal can be briefed as: (1) anaerobic stage: soluble organic materials are transformed by the fermentation of facultative bacteria into low molecule weight fermentation product, that is, volatile fatty acids (VFA), which are then absorbed by phosphorus accumulating organisms (PAO), transferred into cells, and assimilated into carbon energy storage material (PHB/PHV) in the cells, by using the energy from poly-P hydrolysis (resulting in the release of phosphorus out of the cells) and the glucolysis in the cells. (2) aerobic stage: under aerobic conditions, phosphorus accumulating bacteria obtain energy from the oxidative metabolism of PHB/PHV for absorbing phosphorus, and synthesizing and storing poly-P in cells, while synthesizing new cells of phosphorus accumulating bacteria and producing phosphorus-enriched sludge. The energy produced in oxidation process is stored as high-energy polyphosphorous ATP. (3) phosphorus removal: phosphorus is finally removed from water treating system by discharging the phosphorus-enriched sludge produced in the aerobic process. Therefore, the conventional biological phosphorus removal process is actually achieved by using phosphorus accumulating bacteria which release phosphorus under anaerobic condition and absorbing excessive phosphorus under aerobic condition, and the only approach thereof to remove phosphorus is to discharge excess sludge. Therefore, the shorter the sludge age is, the better the effect of phosphorus removal is. An ideal sludge age is 3.5-7 d. In addition, the amount of the phosphorus absorbed under aerobic condition is limited by the amount of the phosphorus released under anaerobic condition, while the amount of the phosphorus released under anaerobic condition, on one hand, requires relatively strict anaerobic environment (DO (dissolved oxygen) should be strictly controlled at a value lower than 0.2 mg/L), and on the other hand, is closely related with the concentration of VFAs. Studies showed that, the ratio of $BOD_5$ to TP should be controlled at 20-30, and the content of VFAs in $BOD_5$ should be higher, if the content of phosphorus in the discharged water after treatment is to be controlled at a value lower than 1.0 mg/L.

Since the new discharging standard requires that an municipal sewage treatment plant should achieve highly efficient removal of carbon, nitrogen, and phosphorus at the same time, therefore, the process selected by the municipal sewage treatment plant should have the functions of both nitrogen removal and phosphorus removal at the same time. As discussed above, according to the principle of conventional biological nitrogen and phosphorus removal, the biological treatment process having the function of both nitrogen and phosphorus removal should be able to create environments alternated by anaerobic, anoxia, and aerobic conditions in a certain order for different kinds of microbes. The environments alternated by anaerobic, anoxia, and aerobic conditions in a certain order can be divided by space or time sequence. At present, the sewage treatment processes having the effect of biological nitrogen and phosphorus removal for municipal sewage treatment can be divided into two classes: continuous flow activated sludge method divided by space and batch-type activated sludge method (or sequencing batch reactor) divided by time. The former is represented by anaerobic-anoxia-aerobic (that is, A-A-O or $A^2/O$) process (the technical principle of which is shown in FIG. 1a), and comprises various modified A²/O processes based on the A²/O processes, for example, A-A²/O process, inverted A²/O process, modified Bardenpho process, UCT process, MUCT process, VIP process, and the like. The latter is represented by sequencing batch reactor (SBR) (the process principle of which is shown in FIG. 2), and comprises various modified SBR processes based on conventional SBR process, for example, ICEAS process, DAT-IAT process, CAST process, CASS process, Unitank process, MSBR process and the like. Continuous flow activated sludge method divided by space is multi-tank biological treatment system, which combines a sludge return system with a mixed liquid return system so that the activated sludge is sequentially subjected to anaerobic, anoxic, aerobic environments or anaerobic, aerobic, anoxic environments in space, so as to achieve and enhance the effect of biological nitrogen and phosphorus removal at the same time. Conventional sequencing batch reactor adopts a single-tank biological treatment system, and has no sludge return system or mixed liquid return system. Therefore, the biochemical reaction and the sludge-water separation by participation are carried out in one reactor. The sewage is fed into the reactor in batches, and treated by the mode of "sewage feeding-reaction-sedimentation-water and sludge discharging-resting" in batches. Anaerobic, aerobic, anoxia environments are sequentially formed in time in the reactor. In order to improve the space utilization of conventional SBR and enhance the ability of nitrogen and phosphorus removal thereof, various modified SBR processes borrow ideas from a multi-tank system, adding a sludge return system or a mixed liquid return system, but at the same time losing some characteristics of conventional SBR process, for example, the characteristics of ideal plug-flow type reactor in time, low probability of sludge bulking, ideal resting and sedimentation, and the like.

At present, the phenomena that nitrogen removal and phosphorus removal can not reach the best effect at the same time when applying a sewage biological nitrogen and phosphorus removal process, especially a multi-tank biological nitrogen and phosphorus removal system, in practice is often observed, that is, good nitrogen removal effect and poor phosphorus removal effect, or good phosphorus removal effect and poor nitrogen removal effect. The reason mainly lies in that the biological nitrogen removal process and the biological phosphorus removal process are contradictory or competitive as follow: (1) biological nitrogen and phosphorous removal comprises the processes of aerobic nitrification, anoxic denitrification, anaerobic phosphorus release, and aerobic phosphorus absorption, and are completed by different kinds of microbes requiring different kinds of substrate and environmental conditions. (2) There is irreconcilable contradiction between the long sludge age as required by the nitrification and the short sludge age as required by biological phosphorus removal. (3) Both anaerobic phosphorus release and anoxic denitrification need a certain amount of carbonic organic materials, especially VFAs. However, since the concentration of VFAs in municipal sewage is generally low (dozens mg/L), the competition caused by insufficient carbon source leads to that phosphorus accumulating bacteria are not dominant. (4) Nitrate imposes adverse influence on the anaerobic phosphorus release. On one hand, nitrate stimulates denitrifying bacteria to compete VFAs with phosphorus accumulating bacteria for biological denitrification, and on the other hand, when the amount of phosphorus accumulated by the phosphorus accumulating bacteria is not high and the level of VFAs in fed water is low, $NO_3^-$ can induce phosphorus accumulating bacteria to absorb phosphorus under anaerobic condition, and inhibits the process of anaerobic phosphorus release, in turn the effect of biological phosphorus removal.

In improving the existing sewage biological nitrogen and phosphorus removal process, most of the researchers focused on the development of so called enhanced biological phosphorus removal (EBPR), that is, on the way to fully utilize the advantage of phosphorus accumulating bacteria, for example, increasing the number of the reactor, increasing a cycling return pipe to eliminate the inhibition of DO and $NO_3^-$ carried by the sludge return system to the anaerobic phosphorus release of phosphorus accumulating bacteria. Obviously, such method will lead to not only the increase in investment and operation cost of sewage treatment system, but also the increase in the number of the reactors and the return pipes. In addition, the sludge ratio, retention time and the distribution of substrate load affect the effect of biological nitrogen and phosphorus removal from another aspect.

The biological phosphorus removal method is usually operated in low cost. However, the experiences in operation of a large number of biological phosphorus removal systemes both in China or aboard showed that, it is quite difficult to constantly keep a TP concentration of lower than 1 mg/L in discharged water. For the purpose of overcoming the disadvantages of biological phosphorus removal system, in the water flow direction, that is, the main flow path in the practical sewage treatment project in US, Europe and China, a chemical phosphorus removal tank is finally arranged so as to form a biological-chemical combined phosphorus removal system, serving as a means for ensuring standard-met phosphorus release. However, the main flow path chemical phosphorus removal suffers from significant problems such as high amount of water to be treated, large dosage, high cost of agents, low agent utilization, large amount of precipitated sludge, low phosphorus content, difficulties in handling, inconvenient phosphorus recycling and reuse, and the like, therefore, it is difficult to be carried out in practical sewage treatment processes.

Phostrip side flow phosphorus removal process was developed in 1960s in the field of sewage treatment (the process principle is shown in FIG. 1b). Such process comprises adding an anaerobic phosphorus release tank in the sludge return direction, that is, the side flow path to a conventional activated sludge method (CAS), so that the phosphorus released by the phosphorus releasing tank flows with the supernate into a chemical phosphorus reaction-participation tank, precipitated by lime or other precipitators therein, being subjected to solid-liquid separation in an initial sedimentation tank or a separate flocculation/sedimentation tank, and finally removed from the system as a chemical precipitate. 10%-30% of the amount of the original sewage is split into an anaerobic phosphorus release tank, where the sludge is retained for an average of 5-20 h (hours), and generally 8-12 h. Phostrip side flow phosphorus removal process can keep a final TP concentration of lower than 1 mg/L in the discharged water from the main path of the sewage treatment, substantially free from the influence by the concentration of organic substance in the fed water, and uses significantly lower amount of chemical agents, lowering the cost of the agents, in comparison with the method adopting a chemical phosphorus removal in the main flow path. However, such process has very limited application up to now due to the following disadvantages: the process lacks nitrogen removal function; the phosphorus-enriched supernate in the anaerobic phosphorus release tank can be elutriated in a limited ratio by injecting elutriating water such as the discharged water from the initial sedimentation tank, the discharged water from the secondary sedimentation tank, or the supernate from the lime sedimentation reactor; substantial suspensions are remained in the supernate; the amount of the chemical precipitate is relatively high; and relatively high operation techniques of the process are required for the operator.

Recently, a modified UCT(University of Cape Town) process, that is, BCFS(biologisch chemisch fosfaat stikstof verwijdering) process (the process principle of which is shown in FIG. 1c) is developed in Kluyver biotechnology laboratory in Delft University of Technology in Dutch. Two reactors, that is, a contacting tank and a mixing tank, are separately provided between the anaerobic tank and the anoxia tank of the main path of the UCT process, and between the anoxia tank and the aerobic tank, so that a 3-step process in the conventional biological phosphorus is changed into a 5-step process, 2 cycling systems are changed into 4 cycling systems, that is, the main path of the process is consisted of 5 reactors and 3 groups of internal cycling systems, and the side flow path is consisted of 1 group of sludge cycling system and 1 phosphorus enriched supernate (from the end of the anaerobic tank, with amount being $1/10$ of the total amount of the original sewage) chemical sedimentation phosphorus removal unit. The contacting tank is equivalent to a second selector, which can effectively prevent the filamentous sludge bulking caused by the product of anaerobic hydrolysis, and the $NO_3$—N carried in the retuned sludge can be denitrified in the contacting tank to removal phosphorus; the mixing tank is controlled to be operated in low DO ($\leq 0.5$ mg/L) state, so that good nitrification and denitrification can be achieved at the same time. On one hand, BCFS process effectively combines aerobic phosphorus absorption, anoxia phosphorus release, and off-line chemical sedimentation of phosphorus-enriched supernate, so that the system has good phosphorus removal effect, with a total phosphorus $\leq 0.2$ mg/L in the discharged water. On the other hand, the process combines the conventional biological nitrogen removal, simultaneous nitrification and denitrification, denitrification phosphorus removal, so as to ensure the system an excellent biological nitrogen removal effect, and a total nitrogen $\leq 5$ mg/L in the discharged water. Therefore, this process is a method that can achieve the best nitrogen and phosphorus removal effect at the same time. However, the BCFS process is extremely complicated, and involves in high infrastructure investment, high operation cost, large occupation, and complicated operation management. Furthermore, the approach for removing phosphorus is mainly achieved by discharging phosphorus-enriched excess sludge, the on-line phosphorus separation and the off-line sedimentation of the anaerobic phosphorus-enriched sewage are only used as an assistant means, and the problems regarding the disposal of large amount of excess sludge and the recycling of the phosphorus resources from the sewage remain unresolved. Therefore, the application of BCFS process in practical sewage treatment project is significantly limited.

In view of the problems regarding a poor nitrogen removal effect of Phostrip side flow phosphorus removal process and the complicated BCFS process, a new biological nitrogen and phosphorus removal process using "external recycle process of aerobic sludge in SBR system" (ERP-SBR) was proposed by Chongqing University (the process principle of which is shown in FIG. 3). The ERP-SBR system additionally provides an enhancing anaerobic phosphorus release tank (that is, an anaerobic reactor) and a chemical phosphorus removal tank to the conventional SBR reactor. Rather than achieving an on-line separation of the phosphorus-enriched supernate at the end of the anaerobic tank of the main flow path in BCFS process, the SBR system performs sedimentation and water discharging, and discharges part of the aerobic phosphorus absorbing sludge together with part of the original sewage to an anaerobic phosphorus release tank, where the sludge subjected to anaerobic phosphorus release is rested and precipitated for sludge-water separation, and then recycled into the SBR reactor and involved in the aerobic phosphorus absorbing process again. The phosphorus-enriched supernate is discharged into a chemical phosphorus removal tank, reacted with the added chemical phosphorus removing agent to produce phosphorus-enriched precipitate, precipitated, and recycled into the SBR reactor for further removing pollutants such as ammonia, phosphorus, organic substance and the like in the sewage. The ERP-SBR process is greatly simplified over BCFS process, and basically replaced the way by which the conventional biological phosphorus removal process discharges aerobic phosphorus-enriched sludge in the main path with a side-flow discharging anaerobic phosphorus-enriched sludge to remove phosphorus. Therefore, the sludge age, the concentration of the sludge, and the activity of the sludge in the SBR reactor are improved, the resistance to shock load is enhanced, the competition of denitrification and anaerobic phosphorus release for carbonic organic substance in conventional nitrogen and phosphorus removal system is avoided, and good effect of nitrogen and phosphorus removal is achieved. Furthermore, by chemically treating phosphorus-enriched sewage comprising only about $1/10$ of the total amount of the original sewage but having a concentration of the phosphorus about ten times that of the original sewage via off-line enhanced anaerobic phosphorus release, the size of the chemical phosphorus removal system is reduced, and the dosage of the chemical agents and the yield of the chemical precipitate are decreased. The agent utilization in chemical phosphorus removal system and the phosphorus content in the chemical precipitate are improved, which in turn favors the recycling and utilization of the phosphorus resource in the phosphorus-enriched chemical precipitate, and eliminates the stage of fixing and disposing the phosphorus in the phosphorus-enriched sludge discharged by the conventional biological phosphorus removal system.

However, ERP-SBR process still has the following disadvantages: (1) the controlling of the sludge age is in dilemma: shortening sludge age is not advantageous for the reason of disfavoring biological nitrogen removal and increasing the disposal cost of the sludge, while prolonging the sludge age can maximally recover and reuse the phosphorus in the sewage as phosphorus-enriched sedimentation; however, prolonging the sludge age will gradually increase the concentration of the sludge in SBR reactor serving as the main reacting tank as the run time is lengthened, the efficiency of sludge-water separation due to gravity sedimentation is gradually decreased, the surface of the sludge is lifted, and the volumetric exchange ratio of the SBR reactor is reduced, which further decrease the space utilization of the SBR reactor, and even cause sludge bulking and degradation in water quality of the discharged water in serious situation; (2) using a decanter as the water decanting device for decanting the supernate at the end of sedimentation in the SBR reactor as the final discharged water, the SS (solid suspension) in the discharged water is difficult to be decreased below 10 mg/L; and the TP carried in the SS in the discharged water is usually 0.5 mg/L since the phosphorus content of the SS in the supernate at the end of the sedimentation in the SBR reactor is generally no less than 5%, so that the discharge of the whole system can hardly meet the requirements about TP as stated in Level A standard of GB18918; (3) the process of anaerobic phosphorus release is short itself, generally about 2 h, however, in the case of high sludge concentration, the sludge-water separation by means of gravity sedimentation in the anaerobic phosphorus release tank needs long precipitating time, and lifts the sludge surface, so that the discharging height of the phosphorus-enriched supernate that can be discharged into the chemical phosphorus removal tank is greatly reduced. Even if the anaerobic phosphorus release has been sufficiently finished, the phosphorus-enriched supernate that can be efficiently discharged into the chemical phosphorus removal tank is less than half of the total phosphorus-enriched sewage, so that the phosphorus removal ability of the system can not be further improved.

CONTENTS OF THE INVENTION

One object of the present invention is to provide a sewage treatment process, by using the process to treat a municipal sewage, carbon, nitrogen and phosphorus can be removed simultaneously without discharging excess activated sludge, and the process has advantages of higher efficiency of nitrogen and phosphorus removal, simpler system procedure, smaller plant area, lower treatment cost and more favorable for recycling element phosphorus in the sewage.

Another object of the present invention is to provide a sewage treatment system.

To achieve above objects of the invention, the following technical solutions are adopted in the present invention:

A process for treating sewage, which comprises the following steps:

a) a sewage feeding step, comprising introducing a raw sewage into a biological reaction tank to a predetermined time or liquid level;

b) a reaction step, comprising performing an aeration intermittently in the biological reaction tank;

c) a step for discharging the treated water, comprising performing solid-liquid separation of the mixed liquid in the biological reaction tank by a membrane separation device to obtain a first permeate which is taken as the final treated water d) a standby step, comprising stopping aeration in the biological reaction tank; and e) a step for discharging phosphorus-enriched water, comprising keeping anaerobic condition in the biological reaction tank and performing solid-liquid separation of the mixed liquid of the biological reaction tank by a membrane separation device to obtain a second permeate, the second permeate entering the interior of a phosphorus recycling unit which is set independently from the biological reaction tank, the phosphorus recycling unit removing phosphorus from water so that the second permeate becomes low-phosphorus water, and the low-phosphorus water flowing back to the biological reaction tank;

the process for treating sewage is operated in cycle by repeating the above steps.

Preferably, the step b) and the step c) are combined to from a reaction-water discharging step: the biological reaction tank is used for both of the sewage feeding step and the water discharging step, and the aeration is carried out intermittently.

Preferably, the step a), the step b) and the step c) are combined to form a sewage feeding-reaction-water discharging step: the biological reaction tank is used for both of the sewage feeding step and the water discharging step, and the aeration is carried out intermittently.

Preferably, the raw sewage is pretreated prior to the step a).

Preferably, the sludge concentration in the biological reaction tank is 2-20 g/L, more preferably 4-15 g/L, most preferably 8-12 g/L.

Preferably, the raw sewage enters in the biological reaction tank in each of the step b) to the step e).

Preferably, the amount of the raw sewage introduced during the step d) and the step e) is 1-40%, preferably 5-20% of the total amount of raw sewage introduced in the biological reaction tank during each operation cycle.

Preferably, the step c) or the step e) is water level-dropping operation.

Preferably, oxygen-rich gas with oxygen concentration above 25% is used as aeration medium in step a), step b) and step c).

Preferably, pure nitrogen with nitrogen concentration above 95% is used as aeration medium in step e).

The present invention also provides a sewage treatment system, comprising a biological reaction tank, a membrane separation device, a phosphorus recycling unit and an aeration device, the aeration device is in the biological reaction tank, the biological reaction tank is communicated with the membrane separation device, the water outlet of the membrane separation device is communicated with a first aqueduct and a second aqueduct, the first and second aqueducts are both provided with valves, the phosphorus recycling unit is communicated with the second aqueduct and the biological reaction tank, a stirring device is provided in the biological reaction tank.

Preferably, the sewage treating system further comprises an air separation device.

Preferably, the sewage treating system further comprises a pre-treatment device, the pre-treatment device comprises at least one of bar screen, strainer, hair collector, grit chamber, primary sedimentation tank, pH adjusting device, ion exchange device, adsorption device, flocculation sedimentation device, floatation device, hydrolysis acidification device, upflow anaerobic sludge bed, expanded granular sludge bed, inter circulation reactor, normal temperature catalytic oxidation device, high temperature catalytic oxidation device, photo catalytic oxidation device, high temperature wet oxidation device, electrolytic device, microwave device.

Preferably, the sewage treating system further comprises a post-treatment device, the post-treatment device comprises at least one of chlorinating disinfection device, ultraviolet disinfection device, ozone device, biological aerated filter, constructed wetland, soil infiltration treatment system, stabilization pond, aquatic plant ponds, adsorption device, flocculation sedimentation device, flocculating filtration device, activated carbon device, ion exchange device, ultrafiltration membrane device, nanofiltration membrane device, reverse osmosis membrane device, electrodialysis device, electrodeionization device.

Preferably, the sewage treating system comprises both of the pre-treatment device and the post-treatment device.

Compared to the prior art, the present invention can perform thorough solid-liquid separation of the mixed liquid in the biological reaction tank by the membrane separation device, can control sludge age more flexible. While the solid-liquid separation is performed in the prior art by gravitational sedimentation, in the case of long sludge age, it is easy to decrease the space utilization of the construction and even reduce water quality due to the high concentration of the sludge, high sludge interface, deterioration of the sludge settling characteristics. Therefore it can maximize the sludge concentration in the biological reaction tank, thus maximize biological nitrogen removal effect and the total amount of phosphorus released and the total amount of phosphorus absorbed by phosphorus accumulating organisms, the system can truly realize efficient removal of phosphorus without removing the excess activated sludge. This not only makes the system get the better effect of nitrogen and phosphorus removal, but also significantly reduces the production of excess activated sludge, and reduces the cost for sludge treatment and disposal.

Further, thoroughly processing solid-liquid separation of the mixed liquid in the biological reaction tank through the membrane separation device will enable effluent at the aerobic and anoxic stages to act as final discharged water for the system, with suspension in the effluent close to zero, this avoids the problem of high suspension amount in effluent which is generally exist in supernatant after sedimentation removal using a surface water removal device such as a decanter in the art, and eliminates excess phosphorus carried by the suspension in effluent, that is, solves the problem of exceed standard of total phosphorus concentration in effluent of sewage treatment system.

In addition, thoroughly processing solid-liquid separation with respect to the mixed liquid in the biological reaction tank through the membrane separation device will remove maximum phosphorus-enriched water formed from phosphorus accumulating organisms releasing phosphorus in anaerobic stage out of the system, and the effluent suspension formed by membrane separation is close to zero, so that the interference of suspension on phosphorus sedimentation when a flocculation sedimentation tank is used as the phosphorus recycling unit in the art is overcome, saving the amount of chemicals for phosphorus removal, reducing the chemical precipitate yield, increasing the phosphorus content in the phosphorus sedimentation, and creating a more advantageous condition for recycling phosphorus resource.

Further, in the present invention, aerobic, anoxic and anaerobic environments are carried out inside a single biological reaction tank sequentially in time order so as to achieve the removal of carbon, nitrogen and phosphorus simultaneously and efficiently, simplify the system in process, and eliminate an anaerobic phosphorus releasing tank compared with ERP-SBR system in the art, and eliminate four reactor and almost all of the recycle system compared with BCFS system. Therefore, under the premise of having the same nitrogen and phosphorus removal capacity, the sewage treatment system of the present invention uses a smaller site area, lower capital investment and operating costs and easier for management and maintenance.

Figure 1A:
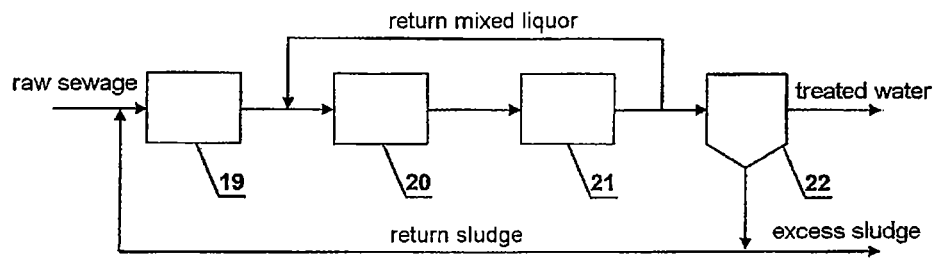
FIG. 1a illustrates a process schematic view of anaerobic-anoxic-aerobic process in the prior art.
Figure 1B:
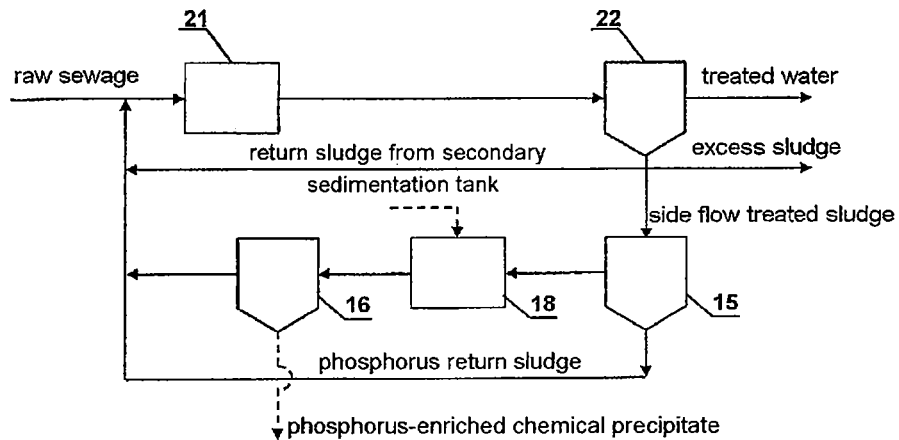
FIG. 1b illustrates a process schematic view of Phostrip process in the prior art.
Figure 1C:
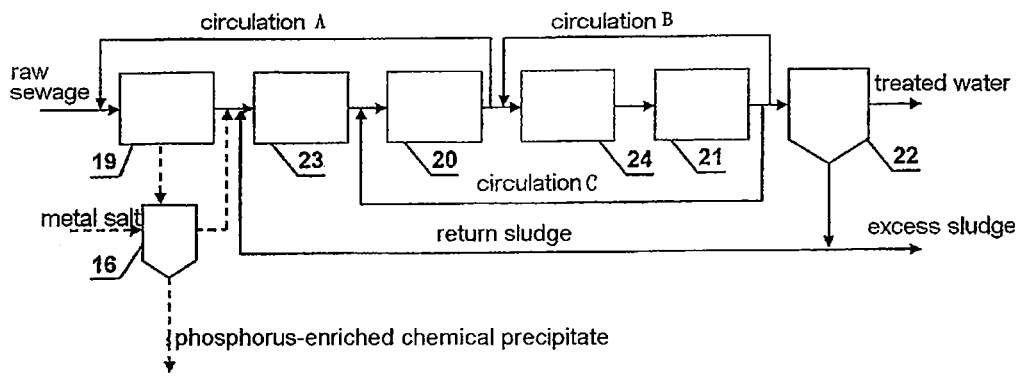
FIG. 1c illustrates a process schematic view of BCFS process in the prior art.
Figure 2:
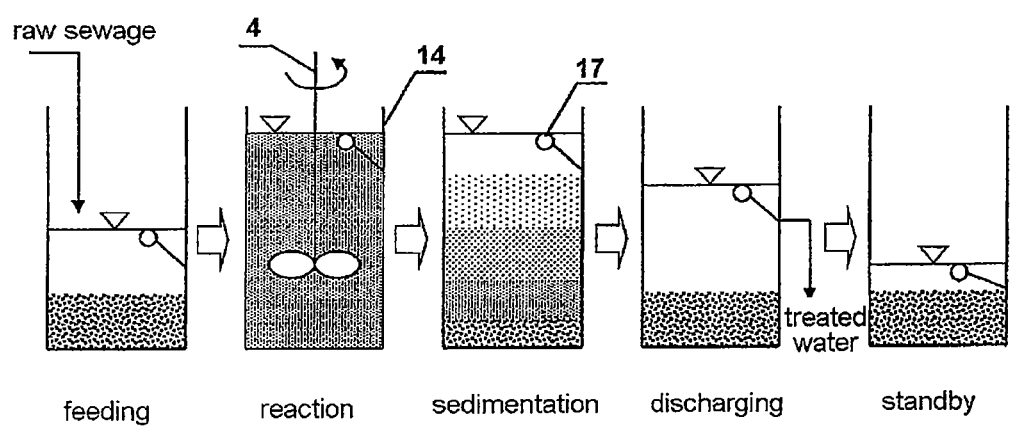
FIG. 2 illustrates a process schematic view of conventional sequencing batch reactor process in the prior art.
Figure 3:
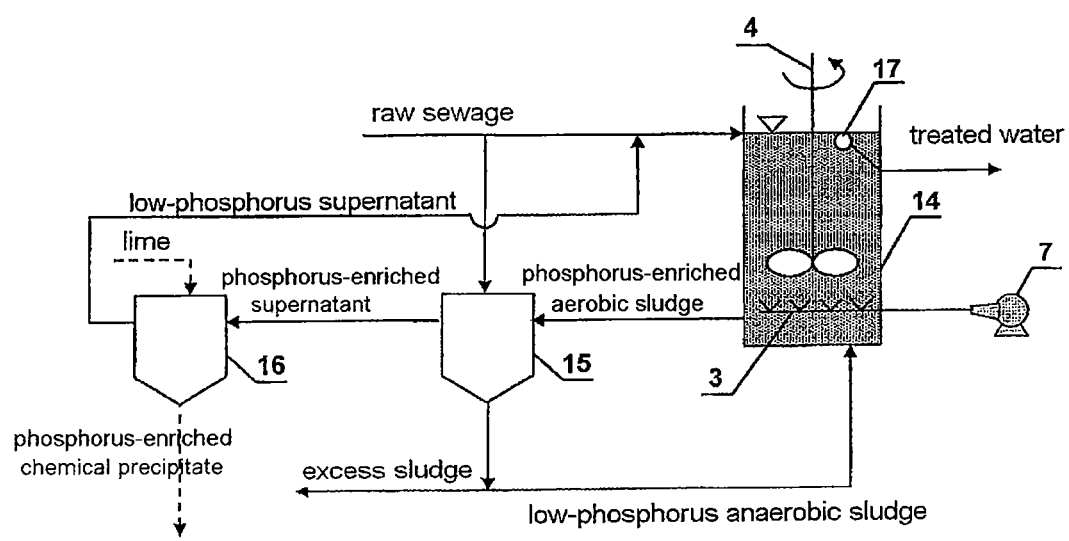
FIG. 3 illustrates a process schematic view of ERP-SBR process in the prior art.

The reference signs in the figures are as follows: 1 biological reaction tank; 2 membrane separation device; 3 aeration device; 4 stirring device; 5 phosphorus recycling unit; 6 suction pump; 7 blower; 8 first aqueduct control valve; 9 second aqueduct control valve; 10 circulating pump; 11 first aqueduct; 12 second aqueduct; 13 membrane filter tank; 14 SBR reactor; 15 phosphorus releasing anaerobic tank; 16 phosphorus sedimentation tank; 17 decanter device; 18 phosphorus mixing reactor; 19 anaerobic tank; 20 anoxic tank; 21 aerobic tank (aeration tank); 22 secondary sedimentation tank; 23 contact tank; 24 mixing tank; 25 liquid supply pipe; 26 liquid backflow pipe; 27 biological reaction tank gas supply valve; 28 membrane filter tank gas supply valve.

DETAILED DESCRIPTION

The above technical solutions are illustrated and explained in detail as follows, in which other technical details involved therein are also illustrated and explained.

A sewage treatment process, comprising the following steps, which are implemented in order circularly according to a certain operation cycle:

(1) sewage feeding step, comprising introducing raw sewage into a biological reaction tank to a predetermined time or liquid level;

During the raw sewage flows into biological reaction tank, only aeration or only mixing can be carried out in the biological reaction tank, also aeration and mixing can be alternatively carried out, or neither aeration nor mixing is carried out.

(2) reaction step, comprising performing aeration and mixing intermittently in the biological reaction tank;

Performing aeration and mixing intermittently in the biological reaction tank enables sewage to contact with microorganism, various types of contaminants in the sewage are absorbed, decomposed or converted by microorganisms. In the aeration stage, the biological reaction tank is in the aerobic state, wherein mainly occurring oxidation of organic matter, aerobic nitrification, simultaneous nitrification and denitrification, and a process of phosphorus accumulating organisms absorbing phosphorus. In the mixing stage, the biological reaction tank is in anoxic state and mainly occurring anoxic denitrification.

(3) treated water discharging step, comprising subjecting the mixed liquid in the biological reaction tank to solid-liquid separation by membrane separation device to obtain a first permeate, which is taken as the final treated water;

When the reaction process has proceeded for some time, the mixed liquid in biological reaction tank is filtered and separated by the membrane separation device, the water and some small molecules go through the membrane into a system effluent, and microorganisms, macromolecules, and inorganic particles are trapped inside the biological reaction tank by membrane. In the process of discharging the treated water, aeration or mixing can be carried out in the biological reaction tank, also aeration and mixing can be alternatively carried out, or neither aeration nor mixing is carried out, in other words, treated water discharging process can be included in the reaction process within any time period or all period continuously or intermittently, can also be carried out after the end of the reaction process.

(4) standby step, comprising stopping aeration in the biological reaction tank;

After aeration stops, mixing can be carried out continuously or intermittently, or mixing may not be carried out, aerobic or anoxic state in the biological reaction tank is becoming anaerobic state, and phosphorus accumulating organisms anaerobic releasing phosphorus process is started. In the standby step, no or little raw sewage is introduced into the biological reaction tank, but in the initial stage, discharging treated water can be continued by membrane separation device, until TP concentration in the treated water is close to or arrives the limited value for discharging.

(5) phosphorus-enriched water discharging step, comprising keeping anaerobic condition in the biological reaction tank and subjecting the mixed liquid of the biological reaction tank to solid-liquid separation by membrane separation device to obtain a second permeate, which enters the interior of a phosphorus recycling unit, which is set independent from the biological reaction tank, where the phosphorus recycling unit removes phosphorus from water in forms of sedimentation or crystal and the second permeate becomes low-phosphorus water, which flows back to the biological reaction tank;

When the standby process is continued till the biological reaction tank is entirely in an anaerobic state and phosphorus accumulating organisms anaerobic releasing phosphorus process is proceeding to a certain extent, phosphorus-enriched water discharging step is started. The mixed liquid in the biological reaction tank is filtered and separated by the membrane separation device, microorganisms, macromolecules, and inorganic particles are trapped inside the biological reaction tank by membrane. Water, some small molecules and phosphorus go through the membrane to form the second permeate, the second permeate is introduced into the interior of phosphorus recycling unit which is set independent from the biological reaction tank, the phosphorus recycling unit removes phosphorus from water in forms of sedimentation or crystal and the second permeate becomes low-phosphorus water, effluent from the phosphorus recycling unit flows back to the biological reaction tank.

In the sewage feeding step, the mixed liquid of biological reaction tank can be maintained in anaerobic state, in anoxic state, or in aerobic state, or it can also be converted from anaerobic state to anoxic state or even further to aerobic state, or it can also be in a coexist or alternative state of aerobic state and anoxic state; in the reaction step and the treated water discharging step, the mixed liquid of biological reaction tank can be maintained in aerobic state, or it can be in a coexist or alternative state of aerobic state and anoxic state; in the standby step, the mixed liquid of biological reaction tank can be converted from anoxic state to anaerobic state; in the phosphorus-enriched water discharging step, the biological reaction tank is in anaerobic state.

When the above five steps proceed in a certain operation cycle order, the active microorganism in the mixed liquid in the biological reaction tank is sequentially subjected to alternating cycles of aerobic, anoxic, anaerobic environments in time series. In the aerobic state, heterotrophic microbial degrades organic substances gradually, nitrifying bacteria oxidize ammonia nitrogen to nitrate, aerobic phosphorus absorbing process of phosphorus accumulating organisms is taken place; in anoxic state, denitrifying bacteria reduces nitrate to nitrogen gas which escape from the water so as to complete the total nitrogen removal; in anaerobic state, anaerobic phosphorus releasing process of phosphorus accumulating organisms is taken place. Different from conventional biological nitrogen and phosphorus removal such as anaerobic-anoxic-aerobic ($A^2/O$), traditional SBR and each variant process thereof, the present invention does not remove phosphorus element from the water by the means of removing the phosphorus-enriched sludge in the aerobic area or at the end of aerobic duration, but accomplishes phosphorus element removal or recycling by means of removing the phosphorus-enriched supernatant formed in the anaerobic stage, which fundamentally sloves the contradiction of controlling sludge age (biosolid retention time, SRT) for simultaneously realizing biological nitrogen removal and phosphorus removal in the conventional biological nitrogen and phosphorus removal processes. Further, different from BCFS process of Delft University of Technology and ERP-SBR process of Chongqing University, the separation of active microorganism and water in the present invention does no longer depend on gravitational sedimentation, but depend on the high-efficient filtration and separation of the membrane separation device. This not only separates the active microorganism from water thoroughly, eliminates all the mixed liquid or sludge outer recycle system except for biological reaction tank, and realize efficient carbon, nitrogen and phosphorus removal in a single biological reaction tank, but also sloves the following three problems facing aforementioned ERP-SBR process: (1) the system operation no longer needs to consider the problem of sludge interface increase along with water filling ratio decrease at a long sludge age, the efficient membrane separation process not only makes more flexible control of sludge age, maximizes the space utilization of the biological reaction tank, but also allows the system to obtain extreme long sludge age (up to 60 days or even 90 to 300 days), and thus reduces the output of excess activated sludge maximumly, and saves the cost for sludge treatment and disposal. Although in the case of long sludge age, the sludge concentration in the biological reaction tank may be 2 to 5 times of that in conventional biological nitrogen and phosphorus removal processes and BCFS process, ERP-SBR process which are 3-4 g/L, that is up to 6-15 g/L, solid-liquid separation is realized using membrance separation process, the system can achieve the treated water discharging step smoothly even with high sludge interface; (2) highly efficient retention of the membrane allows the suspension (SS) in the final system effluent obtained in the treated water discharging step close to zero, which avoids the problem that the particle phosphorus content carried by effluent suspension is enough to make the system exceed TP index; (3) when the anaerobic phosphorus releasing process is finished, the highly efficient membrane separation process is still used to fully realize the solid-liquid separation, and this can not only maximumly remove the obtained phosphorus-enriched supernatant from the biological reaction tank, but also increase maximumly the phosphorus concentration in the phosphorus-enriched supernatant, in another word, this can maximumly transfer the phosphorus of the raw sewage into the phosphorus-enriched supernatant, and decrease as possible the total amount of the discharged phosphorus-enriched supernatant. At the same time, the effluent suspension formed by membrane separation being close to zero eliminates a common problem of suspension interference on phosphorus sedimentation when a flocculation sedimentation tank is used as phosphorus recycling unit in the art, saves the amount of chemicals for phosphorus removal, reduces the chemical precipitate yield, increases the phosphorus content in the phosphorus sediment, and creates more favorable conditions for recycling phosphorus resource.

As a further improvement for the aforementioned sewage treatment process, a sedimentation step can be added between the reaction step and the treated water discharging step. In the sedimentation step, no water flows in or out of the biological reaction tank, neither aeration nor mixing is taken place, the microorganism sedimentates gradually to the bottom of the biological reaction tank due to gravity action. In the subsequent treated water discharging step, the liquid filtered and separated by the membrane separation device is mainly the supernatant in the top of the biological reaction tank, the whole treated water discharging step is a level-dropping operation, it stops until the liquid level in the biological reaction tank goes down to near the sludge interface formed at the end of the sedimentation step. In the subsequent standby step and phosphorus-enriched water discharging step, no or little raw sewage is introduced into the biological reaction tank, but in the initial stage of the standby step, discharging treated water can be continued by the membrane separation device, until TP concentration in the treated water is close to or arrives the limited value for discharging. Of course, the standby step can be omitted, and the phosphorus-enriched water discharging step can be proceed directly, at this point it also can be understood that the standby step and the sedimentation step completely coincide with each other. When the sludge concentration in the biological reaction tank has not arrived a higher value (e.g. MLSS is 4-6 g/L), the sludge interface formed after sedimentation is not high, adding the sedimentation step or changing the standby step to the sedimentation step may enable the feed liquid technical problem be filtered and separated by the membrane separation device no long being a mixed liquor containing a large amount of active microorganisms, but being a supernatant only containing part of suspension. This may properly put off the development of membrane fouling in the internal of the membrane separation device and make it maintain good filter property and delay on-line or off-line cleaning operation.

As another improvement of the above sewage treatment process, the reaction step and the treated water discharging step can be combined to form one step which is reaction and water discharging step. In the reaction and water discharging step, the liquid separated by the membrane separation device is always the mixed liquid in the biological reaction tank, and the resulting first permeate acts as final treated water of the system. Aeration and mixing can be alternatively carried out in the biological reaction tank. Water can either be introduced or discharged, or can be only discharged but not introduced. Means of introducing or discharging water can be continuously or intermittently. In the following standby step and phosphorus-enriched water discharging step, no or little raw sewage is introduced into the biological reaction tank, but in initial stage of the standby step, discharging treated water can be continued by the membrane separation device, until TP concentration in the treated water is close to or arrives the limited value for discharging.

As another improvement of the above sewage treatment process, the sewage feeding step, the reaction step and the treated water discharging step can be combined to form one step which is sewage feeding-reaction-water discharging step. In the sewage feeding-reaction-water discharging step, the liquid separated by the membrane separation device is always the mixed liquid in the biological reaction tank, and the resulting first permeate acts as final treated water of the system. Aeration and mixing can be alternatively carried out in the biological reaction tank, sewage feeding and water discharging can be carried out, and sewage feeding or water discharging can be carried out continuously or intermittently. In the following standby step and phosphorus-enriched water discharging step, no or little raw sewage is introduced into the biological reaction tank, but in initial stage of the standby step, discharging treated water can be continued by the membrane separation device, until TP concentration in the treated water is close to or arrives the limited value for discharging.

When the mixed liquid in the biological reaction tank is in the aerobic state, DO value in the liquid phase main area is generally not less than 1.0 mg/L, preferably not less than 1.5 mg/L and more preferably 2.0-3.0 mg/L; OPR (oxidation-reduction potential) is generally not lower than +100 mV and preferably +180 to +600 mV; the temperature is generally 4-45° C. (Celcius), preferably 15-30° C; pH value is generally 6.0-9.0, preferably 6.5-8.5 and more preferably 7.0-8.0.

When the mixed liquid in the biological reaction tank is in the anoxic state, DO value in the liquid phase main area is generally not higher than 1.0 mg/L, preferably not higher than 0.5 mg/L and more preferably 0.2-0.4 mg/L; OPR value is generally not higher than −50 mV and preferably −100−−50 mV; the temperature is generally 4-45° C., preferably 15-30° C.; pH value is generally 6.0-9.0, preferably 6.5-8.0 and more preferably 7.0-7.5; the ratio of $BOD_5$ of inlet in the biological reaction tank to TKN is generally not less than 2.5, preferably not less than 3.5 and more preferably not less than 5.

When the mixed liquid in the biological reaction tank is in the anaerobic state, DO value in the liquid phase main area is generally not higher than 0.5 mg/L, preferably not higher than 0.2 mg/L and more preferably 0-0.1 mg/L; OPR value is generally not higher than −200 mV and preferably −350 to −200 mV; the temperature is generally 4-45° C., preferably 15-30° C.; pH value is generally 6.0-9.0, preferably 6.5-8.5 and more preferably 7.5-8.0; the ratio $BOD_5$ of inlet in the biological reaction tank to TP is generally not less than 10, preferably not less than 20 and more preferably not less than 25.

The time for the sewage feeding step is generally 0.2-4 hours, preferably 0.5-2 hours; the time for the reaction step is generally 1-24 hours, preferably 2-12 hours; the time for the treated water discharging step is generally 0.2-12 hours, preferably 0.5-8 hours; the time for the standby step is generally 0.2-4 hours, preferably 0.5-2 hours; the time for the phosphorus-enriched water discharging step is generally 0.2-4 hours, preferably 0.5-2 hours. When the sedimentation step is added between the reaction step and the treated water discharging step, its time is generally 0.2-4 hours, preferably 0.5-2 hours. When the reaction step and treated water discharging step are combined to form the reaction-discharging step, its time is generally 1-24 hours, preferably 2-12 hours. When the sewage feeding step, the reaction step and treated water discharging step are combined to form the inlet-reaction-discharging step, its time is generally 1-24 hours, preferably 2-12 hours. The operation cycle is generally 3-48 hours, and preferably 4-12 hours.

The sewage treatment process can be operated in a fixed cycle or a varying cycle. When the content of target pollution such as organics, nitrogen and phosphorus in the raw water, the mixed liquid in the biological reaction tank and the treated water and the phosphorus-enriched water can be monitored on-line, these data can be collected realtime by automatic control system to calculate reasonable operation cycle and the time of duration of each step in the cycle which is then sent as a directive by the automatic control system to an actuating mechanism and implemented. Preferably, the sewage treatment process is implemented by realtime monitoring variable cycle of the change of target pollution such as organics, nitrogen and phosphorus in the raw sewage, the mixed liquid in the biological reaction tank and the treated water and the phosphorus-enriched water. This may minimize energy and dose consumption of the whole sewage treatment system.

The raw sewage can be introduced into the biological reaction tank continuously or intermittently. In one operation cycle, the raw sewage can be introduced into the biological reaction tank only in the sewage feeding step, or the sewage can be introduced both in the sewage feeding step and in other steps (except for the sedimentation step). Preferably, the sewage is introduced into the biological reaction tank both in the sewage feeding step and other steps (except for the sedimentation step). Thus in all of the aerobic state, anoxic state and anaerobic state, the raw sewage is introduced into the biological reaction tank, which avoids the competition for carbon source organics between anoxic denitrification process and anaerobic phosphorus releasing process commonly existing in the conventional biological nitrogen and phosphorus removal systems, and can better distribute carbon source organics between the biological nitrogen removal and biological phosphorus removal so as to achieve better nitrogen and phosphorus removal effects. In the standby step and phosphorus-enriched water discharging step, the amount of the raw sewage introduced into the biological reaction tank is 1-40%, preferably 5-20% of the amount of total raw sewage introduced into the biological reaction tank in each operation cycle.

In the treated water discharging step, the reaction-water discharging step and the phosphorus-enriched water discharging step, the raw sewage can be introduced into the biological reaction tank continuously or intermittently in any time period or all the time, in other words, the treated water discharging step, the reaction-water discharging step and the phosphorus-enriched water discharging step can be either a constant water level operation or a water level-dropping operation. When the treated water discharging step or the reaction-water discharging step is a water level-dropping operation, the raw sewage can be introduced into the biological reaction tank in the following standby step either in any time period or all the time, or the raw sewage is not introduced anymore. When the treated water discharging step or the reaction-water discharging step is a constant water level operation, no raw sewage is introduced into the biological reaction tank in the following standby step. Preferably, both of the treated water discharging step and the reaction-water discharging step are water level-dropping operation, that is, the water level in the biological reaction tank decreases over time. Thus in the following standby step and phosphorus-enriched water discharging step, even a small amount of raw sewage continues to be introduced into the biological reaction tank, the water level in the biological reaction tank is still controlled at a lower level, thus the phosphorus concentration in the phosphorus-enriched supernatant can be increased and the totale amount of phosphorus-enriched sewage discharged into the phosphorus recyling unit can be decreased so as to save the dose of associated reagents.

According to the growth type of microorganism in the biological reaction tank, the biological reaction tank can be a suspended growth type activated sludge reactor, or an attached growth type biofilm reactor, or a combination reactor with both suspended growth type activated sludge and attached growth type biofilm. Preferably, the biological reaction tank is a suspended growth type activated sludge reactor. According to the flow state of material in the reactor, the biological reaction tank can be a plug flow reactor, or a completely mixed reactor, or a reactor which, like an oxidation ditch, has both a plug flow pattern and a completely mixed flow pattern.

The aeration manner of the biological reaction tank can be a continuous type, or an intermittent type or a pulse type.

When the biological reaction tank is in the aerobic state, in the anoxic state or in the aerobic-anoxic coexisting or alternative state, the aeration medium in the biological reaction tank may be compressed air, or oxygen-enriched gas with the volume concentration of oxygen no less than 25%; when the biological reaction tank is in anaerobic state, only mixing can be carried out in the biological reaction tank, or aeration can be carried out using pure nitrogen with nitrogen volume concentration no less than 95% as medium. Preferably, when the biological reaction tank is in the aerobic state, in the anoxic state or in the aerobic-anoxic coexisting or alternative state, oxygen-enriched gas with the volume concentration of oxygen no less than 25% is used as aeration medium, more preferably use pure oxygen with oxygen volume concentration no less than 95% as aeration medium; when the biological reaction tank is in anaerobic state, preferably use pure nitrogen with nitrogen volume concentration no less than 95% as aeration medium, more preferably use pure nitrogen with nitrogen volume concentration no less than 99% as aeration medium. So regardless the membrane separation device carries out the treated water discharging step or the phosphorus-enriched water discharging step, a gas/water two-phase flow formed by aeration cross flows on the surface of filter unit to form a hydraulic shear force for effectively inhibiting deposition of pollutants on the surface of filter unit, avoiding the increase of filtration resistance of the membrane fouling phenomenon and allowing the membrane separation device keep good filter property. Meanwhile, when the biological reaction tank is in the anaerobic state, using pure nitrogen as aeration medium may not destroy the anaerobic atmosphere inside the biological reaction tank to ensure the performance of the phosphorus-enriched water discharging step; when the biological reaction tank is in aerobic state, anoxic state or aerobic-anoxic coexisting or alternative state, using oxygen-enriched gas or pure oxygen as aeration medium allows a higher oxygen transfer efficiency, and it can not only keep the biological reaction tank in a higher sludge concentration and sludge activity, improve sludge sedimentation property, decrease residual active sludge production and facilitate the growth of nitrobacterias, but also further save power consumption. Further, pure nitrogen and oxygen-enriched gas (pure oxygen) can both made from air and their preparation technology is mature and the cost is relatively low. It is a common technology for obtaining oxygen and nitrogen separated by air separation device. The air separation device can employ cryogenic air separation method or can employ room temperature air separation method such as pressure swing adsorption (PSA) and membrane air separation method, or can employ other methods known in the air separation field. The air separation device is referred as AS device.

The MLSS (mixed liquid suspended solids) in the biological reaction tank is generally 2-20g/L, preferably 4-15g/L, and more preferably 8-12g/L.

The present invention also provides a sewage treatment system, comprising a biological reaction tank, a membrane separation device, a phosphorus recyling unit and an aeration device, the aeration device being within biological reaction tank, the biological reaction tank is communicated to the membrane separation device, the water outlet of the membrane separation device is communicated to the first aqueduct and the second aqueduct, the first and second aqueducts are both provided with valves, the phosphorus recyling unit is communicated to the second aqueduct and the biological reaction tank, a stirring device is provided in the biological reaction tank.

One or more filter units are provided in the membrane separation device. The filter unit refers to a module having filtering function, which can be various filter units available in the field of water treatment, such as a hollow fiber bundle type membrane module, a hollow fiber curtain type membrane module, a plate and frame type membrane module, a capillary type membrane module, a tube type membrane module and microporous filter pipe, etc.

The membrane separation device for solid-liquid separation in the stage of the treated water discharging step and the membrane separation device for solid-liquid separation in the stage of the phosphorus-enriched water discharging step can be the same set of device, or one is a part of the other, or two sets of independent devices. Preferably, the same one set of membrane separation device is used to perform both the solid-liquid separation of the treated water discharging step and the phosphorus-enriched water discharging step.

The membrane separation device can be disposed inside the biological reaction tank and submerged under the liquid level, that is to compose so-called submerged MBR with the biological reaction tank, or it can be disposed independently outside the biological reaction tank, that is to compose so-called side stream MBR with the biological reaction tank. Preferably, the membrane separation device is disposed independently outside the biological reaction tank. This makes it easier for the membrane separation device to be installed, checked and cleaned on-line.

The membrane flux of membrane separation device when performing the treated water discharging step (i.e. permeated liquid flowrate of the membrane separation device under common working on unit surface and in unit time) and the membrane flux when performing the phosphorus-enriched water discharging step can be the same or different. Considering that when the membrane separation device performs the phosphorus-enriched water discharging step, the biological reaction tank should keep in the anaerobic state, even though using pure nitrogen as aeration medium can not destroy the anaerobic state and can also use the cross-flow of gas-water two-phase flow as a means for inhibiting membrane fouling, the water surface turbulence caused by aeration still can lead to a certain degree of atmospheric reaeration, therefore, the aeration strength should be controlled at a lower level. Therefore, preferably, the membrane flux when performing the phosphorus-enriched water discharging step is lower than the membrane flux of membrane separation device when performing the treated water discharging step, which facilitates the membrane separation device to keep better filtering property.

The phosphorus recyling unit can remove phosphorus from the water; the phosphorus removal means may employ various processes in the water treatment field such as sedimentation, adsorption, crystallization, etc. For example, it may be a coagulation and sedimentation tank (or a coagulation and sedimentation device), may be an adsorbing tank (or an adsorption device), and may also be other reaction unit which can remove phosphate from the aqueous solution by sedimentation, adsorption or crystallization. The coagulator or adsorbor used can be an inorganic salt or polymer formed with calcium (Ca), aluminum (Al), iron (Fe), magnesium (Mg) or other metal cations, or a mixture of one or more of the above chemicals. Selecting which phosphorus removal means is not limited, as long as the second permeate is changed from the phosphorus-enriched water to low-phosphorus water. Because the water entered into the phosphorus recyling unit is the second permeate of the membrane separation device, suspension is close to zero, thus eliminating the problems of suspension interfering phosphorus sedimentation when the a flocculation sedimentation tank is used as the phosphorus recyling unit in the art, saving the amount of chemicals for phosphorus removal, reducing the chemical precipitate yield, increasing the phosphorus content in the phosphorus sedimentation, and creating a more advantageous condition for recycling and recycling phosphorus resource.

A pre-treatment device can be provided at the front section of the sewage treatment system, which means herein a device can treat the raw sewage before the raw sewage enters into the biological reaction tank. The pre-treatment device is composed of one or two or more of the following: bar screen, strainer, hair collector, grit chamber, primary sedimentation tank, equalization tank, grease/oil interceptor, PH adjusting device, ion exchange device, adsorption device, coagulation sedimentation device, floatation device, anaerobic reaction device (including but not limited to hydrolysis acidification, upflow anaerobic sludge bed, expanded granular sludge bed, inter circulation reactor, etc), advanced oxidation device (including but not limited to normal temperature catalytic oxidation, high temperature catalytic oxidation, photo catalytic oxidation, high temperature wet oxidation), electrolytic device, microwave device. The pre-treatment device is used to remove big blocks of floating objects, suspended objects, long fibrous objects, mud and sands, grease and oil, heavy metals that are harmful to microorganism, and organic pollutants hardly being degraded by microorganisms, so that the temperature of water after being pre-treatment is kept between 10-40° C., pH value is kept between 6-9, the ratio of five day Biochemical Oxygen Demand ($BOD_5$) to Chemical Oxygen Demand (COD) is kept above 0.3. The pre-treated sewage enters the biological reaction tank.

A post-treatment device can be provided at the rear section of the sewage treatment system, which means a device performs further treatment of the first permeate. The post-treatment device is composed of one or two or more of the following: chlorinating disinfection device (the disinfectant including but not limited to chlorine gas, sodium hypochlorite, chlorine dioxide, etc.), ultraviolet disinfection device, ozone device, biological aerated filter, constructed wetland, soil infiltration treatment system, stabilization pond, aquatic plant ponds, adsorption device, flocculation sedimentation device, flocculating filtration device, activated carbon device (particle or powder, aeration or not), ion exchange device, ultrafiltration membrane device, nanofiltration membrane device, reverse osmosis membrane device, electrodialysis device, electrodeionization device. The post-treatment device is used to further disinfect and decolorize the first permeate, or further remove organics and inorganic salts remaining in the first permeate. The post-treated permeate enters a collecting device for water production.

Preferably, the pre-treatment device and the post-treatment device can be simultaneously provided in the front section and the rear section of the sewage treatment system respectively.

Analyzers for DO or ORP can be provided in the sewage treatment system to on-line monitor continuously and automatically the real-time DO or ORP value of the mixed liquor inside the biological reaction tank and dynamically adjust the output gas amount of the aeration device, so that energy consumption can be further saved, and the environment inside the biological reaction tank can be better adjusted and controlled to smoothly shift and alternate between aerobic state, anoxic state and anaerobic state.

Analyzers for water quality indicators such as COD, BOD, TOC (total organic carbon), $NH_4^+$—N (ammonium nitrogen), $NO_2^-$—N (nitrite nitrogen), $NO_3^-$—N (nitrate nitrogen), TKN (total Kjeldahl nitrogen), TN (total nitrogen), phosphate, TP (total phosphorus) can be provided in the sewage treatment system to on-line monitor continuously and automatically the above water quality indicators in the raw sewage, the mixed liquor in the biological reaction tank and the treated water, the phosphorus-enriched water, and thus dynamically adjust the operation cycle of the system, the lasting time of each step in the cycle and the environment inside the biological reaction tank. This may not only ensure each of water quality indicators of the treated water stably comply with corresponding limited value for discharging, but also minimize energy and reagents consumption of the whole sewage treatment system.

The principle and variation of the sewage treatment system according to the invention described above are also applicable to the sewage treatment process provided by the invention. That is, the sewage treatment process and the sewage treatment system according to the invention are supplementary to each other. The cooperative use thereof complements with each other, and can achieve a better sewage treatment effect.

The technical solution of the invention will be further described in detail in connection with the accompanying drawings and embodiments.

EXAMPLE 1

Figure 4A:
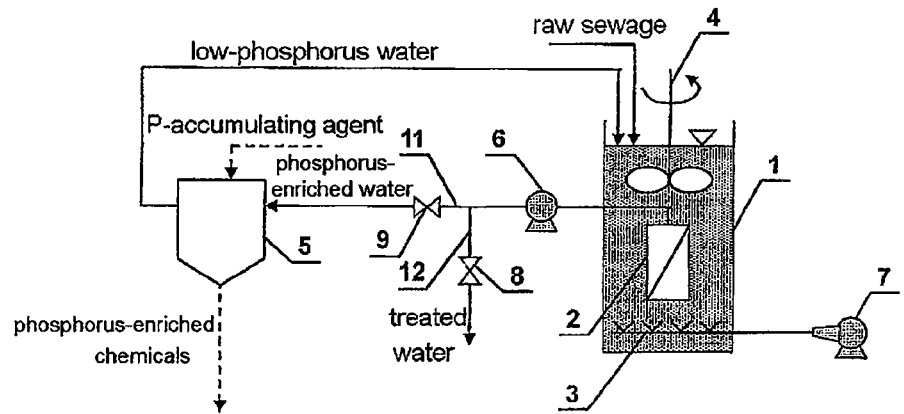
FIG. 4a illustrates a process schematic view of the sewage treatment process provided in Example 1 of the present invention.

As shown in FIG. 4a, a sewage treatment system comprises a biological reaction tank 1, a membrane separation device 2 installed inside the biological reaction tank 1, an aeration device 3 and a stirring device 4, a phosphorus recyling unit 5 installed outside the biological reaction tank 1, a suction pump 6 whose suction port is communicated to water outlet of the membrane separation device 2, a blower whose gas outlet is communicated to the gas inlet of the aeration device 3. The pipeline communicated to the water outlet of the suction pump 6 is divided into two branch pipelines, i.e. the first aqueduct 11 and the second aqueduct 12, wherein the first aqueduct 11 is communicated to a produced water collecting device, the second aqueduct 12 is communicated to the water inlet of the phosphorus recyling unit 5 whose water outlet is communicated to the biological reaction tank 1 by pipeline. An electrically operated valve is installed on each of the first aqueduct 11 and the second aqueduct 12, which are a first quaeduct control valve 8 and a second quaeduct control valve 9.

The internal net size of the biological reaction tank 1 is 10 m (width)×25 m (length)×5.6 m (depth), the effective water depth is 5 m, and the effective volume is 1250 m³. The internal net size of the produced water storing tank 5 is 5 m (width)×20 m (length)×5.6 m (depth), the effective water depth is 5 m, and the effective volume is 500 m³.

There are 50 members of the membrane separation device 2, which are arranged in two rows each having 25 devices. The contour dimension of each membrane separation device 2 is 1000 mm (length)×1000 mm (width)×2000 mm (height). Total 20 pieces of filter units integrated in each membrane separation device 2 are hollow fiber curtain type membrane modules, in which each piece of the hollow fiber curtain type membrane modules composed of 598 hollow fibrous membrane fibers. The outer diameter of the hollow fibers is 2.8 mm, the average membrane pore diameter is 0.4 μm, the material thereof is polyvinylidene fluoride. The upper ends of the fibers can swing freely, each of the fibers is in blind hole state and is sealed using a flexible epoxy resin. The lower ends of the fibers are collected and casted in an end portion using epoxy resin, and are secondarily casted using polyurethane so as to protect the root portion of fiber. The end portion is externally provided with a produced water pipe which has a diameter of 10 mm. All the produced water pipes are communicated in parallel to a water collection branch pipe of each membrane separation device 2. All the water collection branch pipes of each membrane separation device 2 are communicated in parallel to a water collection manifold pipe, which is communicated to the suction port of suction pump 6.

There are four suction pumps 6, three in use and one for backup, with the flow rate of each being 100 m³/h (cubic meters per hour), the pump lift thereof being 32 m, the suction lift thereof being 8 m, and the power thereof being 15 kW (kilowatt). There are three blowers 7, two in use and one for backup. The wind rate of each blower 7 is 20.87 m³/min, wind pressure thereof is 58.8 kPa, rotate speed thereof is 1400 r/min, and the power thereof is 37 kW. The phosphorus recyling unit employs flocculation sedimentation reactor composed of a folded plate flocculation tank and an equidirectional inclined plate sedimentation tank, wherein the effective volume of the inclined plate sedimentation tank is 30 m³, hydraulic retention time is 6-18 min, the hydraulic surface load of the equidirectional inclined plate sedimentation tank is 30 m³/m²·h, distance between inclined plates is 35 mm.

When the raw sewage is common municipal sewage, its main indexes of water quality are as follows: pH=6-9, $COD_{Cr}$=400-500 mg/L, $BOD_5$=100-300 mg/L, SS=100-300 mg/L, ammonia nitrogen=20-60 mg/L, TN=20-80 mg/L, TP=2-8 mg/L. Pre-treatment devices can be set as follows along the water flow direction at the front section of the sewage treatment device of the invention: gate shaft, coarse grid, sump, fine grid and grit chamber. For the coarse screen, a rotary screen machine with a discharge capacity of 1200 m³/h and a grille gap of 20 mm can be used; the sump has an effective volume of 100 m³ and provided with three (two in use and one for backup) submersible sewage pumps having a flow rate of 600 m³/h, a pump lift of 12 m, and a power of 37 kW. A rotating screen machine with a discharge capacity of 1200 m³/h and a grille gap of 5 mm can be used as the fine screen. Two sets of rotational sand processor with treating capacity of 600 m³/h are provided with one spiral grit-water separator for the grit chamber.

For the type of raw sewage described above, the sewage treatment system of the invention can reach a treatment capacity of 5000 m³/day. The hydraulic retention time of the biological reaction tank 1 is about 6 hours, MLSS (mixed liquid suspended solids) thereof is 5-8 g/L, volume load thereof is 0.8-1.2 kg-BOD/(m³·d⁻¹), sludge load thereof is 0.1-0.24 kg-BOD/(kg-MLSS·d⁻¹). The hydraulic retention time of the produced water storing tank 5 is about 2.4 h.

Figure 5A:
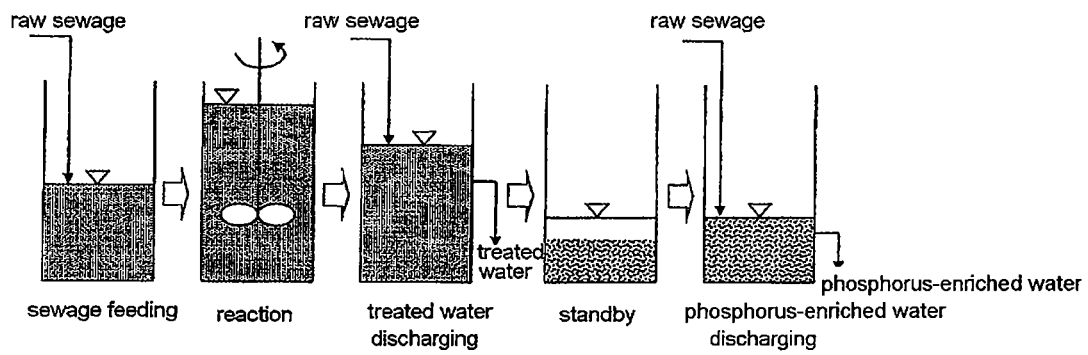
FIG. 5a illustrates a flow chart of the sewage treatment process provided in Example 1 of the present invention.
Figure 5B:
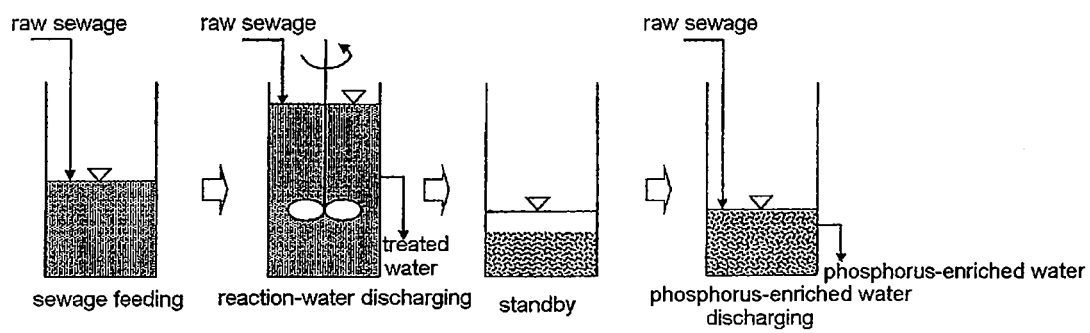
FIG. 5b illustrates a flow chart of the sewage treatment process provided in Example 2 of the present invention.
Figure 5C:
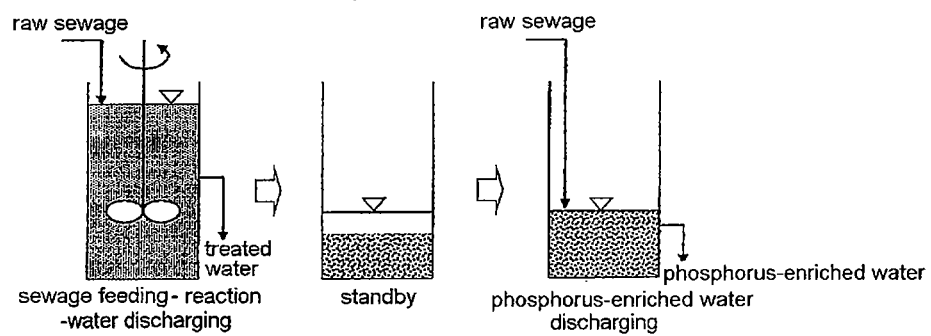
FIG. 5c illustrates a flow chart of the sewage treatment process provided in Example 3 of the present invention.
Figure 6:
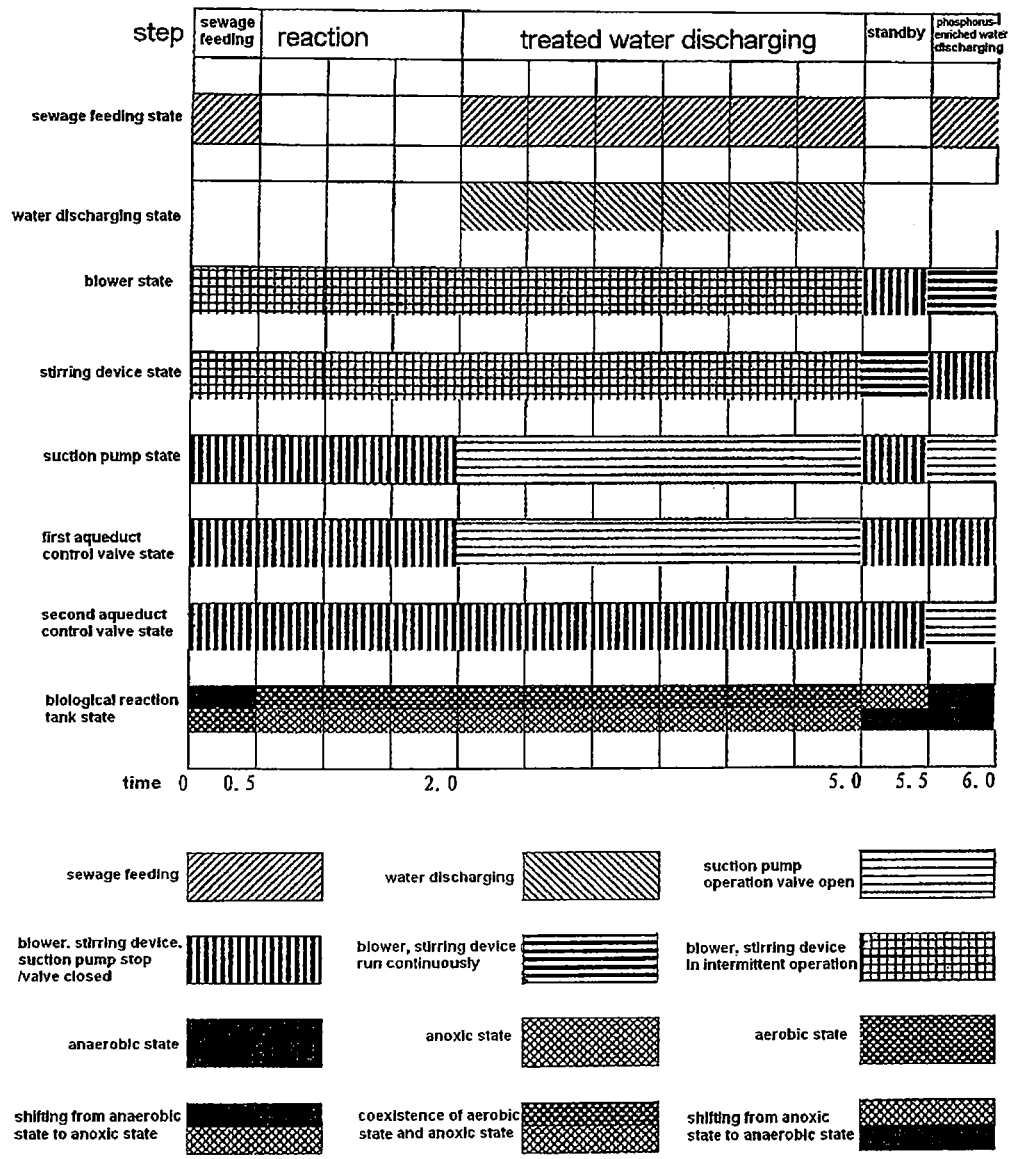
FIG. 6 illustrates a process operation schematic view of the sewage treatment process and system according to Example 1 of the present invention.

As shown in FIG. 5a and FIG. 6, the operation of the sewage treatment system of the invention is conducted in five steps: sewage feeding, reaction, treated water discharging, standby and phosphorus-enriched water discharging, wherein the time for the sewage feeding step is 0.5 hour, the time for the reaction step is 1.5 hours, the time for the treated water discharging step is 3 hours, the time for the standby step is 0.5 hour, the time for the phosphorus-enriched water discharging step is 0.5 hour, and the total operation cycle is 6 hours. When the system is in the sewage feeding step, the reaction step and the treated water discharging step, the blower 7 runs intermittently, providing oxygen-enriched gas with oxygen volume concentration of 25%, and it stops for 10 min after running 20min, the stirring device 4 starts to run to complete the mixing of the mixed liquid in the biological reaction tank 1 during the blower 7 stopping operation, and the stirring device 4 stops when the blower 7 starts to run. When the system is in the standby step, the blower 7 stops to run. When the system is in the phosphorus-enriched water discharging step, the blower 7 is operated continuously, providing pure nitrogen with the nitrogen volume concentration of 95%. When the system is in the standby step and the phosphorus-enriched water discharging step, the stirring device 4 runs continuously. When the system is in the sewage feeding step, the flow rate of the fed sewage is 1000 m$^3$/h, at the end of sewage feeding step, the total sewage entered into the biological reaction tank 1 is 500 m$^3$, meanwhile, the total amount of the low-phosphorus water flows from the phosphorus recycling unit 5 back to the biological reaction tank 1 is 150 m$^3$, thus the total water amount entered into the biological reaction tank 1 in the sewage feeding step is 650 m$^3$, the water depth in the biological reaction tank 1 rises from 2.4 m to 5.0 m. Then the system proceeds into the reaction step, in the reaction step, sewage is not introduced into the biological reaction tank 1, and intermittent aeration and mixing are performed. In the following treated water discharging step, suction pump 6 starts to run and the first aqueduct control valve 8 is open simultaneously, while the second aqueduct control calve 9 is closed. Under the effect of the negative pressure provided by the suction pump 6, the membrane separation device 2 performs solid-liquid separation of the mixed liquid in the biological reaction tank 1 to obtain the first permeate, and the first permeate flows into a produced water collecting device via the first aqueduct 11. In the treated water discharging step, sewage is continuously introduced into the biological reaction tank 1, wherein the fed sewage has a flow rate of 200 m$^3$/h, a total sewage amount of 600 m$^3$, and the average working flow rate of the suction pump is 416.67 m$^3$/h, the total amount of the first permeate discharged from the biological reaction tank 1 and taken as the system final treated water is 1250 m$^3$. At the end of the treated water discharging step, the water depth in the biological reaction tank 1 drops from 5.0 m to 2.4 m. In the following standby step, no water is introduced in or discharged out of the biological reaction tank 1, the aeration stops, continuous mixing is carried out, and the biological reaction tank 1 changes gradually to anaerobic state. In the following phosphorus-enriched water discharging step, sewage is introduced continuously into the biological reaction tank 1 with a flow rate of 300 m$^3$/h and continuous stirring is continued, the suction pump 6 is restarted with an average work flow rate of 300 m$^3$/h, the second aqueduct control valve 9 is opened at the same time while the first aqueduct control valve 8 is closed. Under the effect of the negative pressure provided by the suction pump 6, the membrane separation device 2 performs solid-liquid separation of the mixed liquid in the biological reaction tank 1 to obtain the second permeate, and the second permeate flows into the phosphorus recycling unit 5 via the second aqueduct 12. After passing through the coagulation reaction tank and inclined plate sedimentation tank inside the phosphorus recycling unit 5, the TP concentration of the second permeate drops from 25 mg/L to 1 mg/L. In the phosphorus-enriched water discharging step, water depth in the biological reaction tank 1 is kept 2.4 m, the total amount of the fed sewage is 150 m$^3$, the total amount of the second permeate is of 150 m$^3$, and the total amount of phosphorus removed from the system in form of phosphorus chemical sediment by the phosphorus recycling unit 5 is about 3.6 kg. At this point, the sewage treatment system of the invention completes all steps of one operation cycle, and the total amount of the treated sewage is 1250 m$^3$. The sewage treatment system of the invention can run 4 complete operation cycles every day, and the sewage treatment capacity is 5000 m$^3$/d.

After being treated by the sewage treatment system of the invention, the main indexes of the produced water are as follows: $COD_{Cr}$=20-30 mg/L, $BOD_5$=1-5 mg/L, SS=0 mg/L, TN=4-10 mg/L, TP<0.5 mg/L, and the removal rates are respectively as follows: $COD_{Cr}\geq$94%, $BOD_5\geq$96%, SS=100%, TN$\geq$80%, TP$\geq$90%.

EXAMPLE 2

Figure 4B:
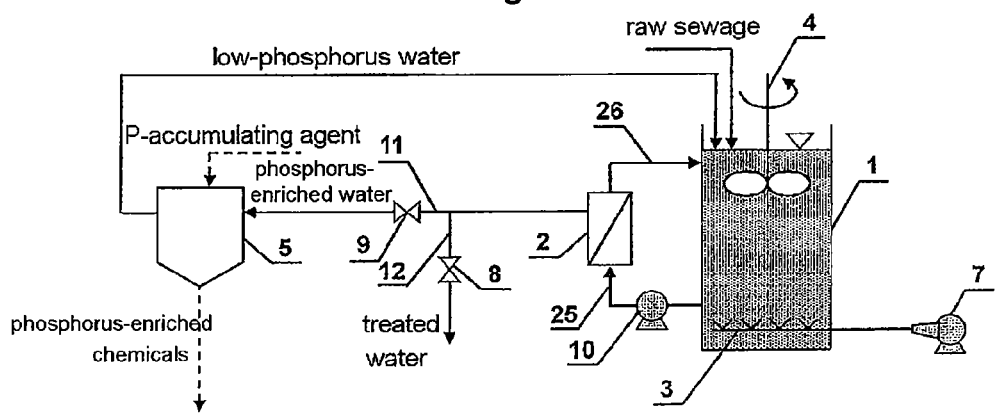
FIG. 4b illustrates a process schematic view of the sewage treatment process provided in Example 2 of the present invention.

As shown in FIG. 4b, a sewage treatment system is provided, most structures of which are the same as the Example 1, except that the membrane separation device 2 is disposed outside of the biological reaction tank 1, the biological reaction tank 1 and the membrane separation device 2 are communicated through liquid supply pipe 25 and liquid backflow pipe 26, wherein circulating pumps 10 is disposed on the liquid supply pipe 25. There are 6 circulating pumps 10, four in use and two for backup, the flow rate of each one being 800 m$^3$/h, the pump lift thereof being 12 m, and the power thereof being 45 kW. No suction pump is provided in the sewage treatment system of the invention, and the pre-treat device at the early stage thereof is the same as that in Example 1.

There 200 members of membrane separation device 2 which are divided into 4groups, 50 for each group. Every group is arranged in two rows each having 25 devices. The contour dimension of each membrane separation device 2 is 200mm (diameter) ×2000 mm (height). Total 7 bundles of filter units integrated in each membrane separation device 2 are hollow fiber bundle type membrane modules, with each bundle of the hollow fiber bundle type membrane module composed of 400 hollow fibrous membrane fibers. The outer diameter of the hollow fibers is 2.8 mm, the average membrane pore diameter is 0.4 μm, the material thereof is polyvinylidene fluoride. The upper ends of the fibers can swing freely, each of which is in the closed state and is sealed using a flexible epoxy resin. The lower ends of the fibers are collected and cast in an end portion using epoxy resin, and are secondarily cast using polyurethane so as to protect the root portion of membrane fibers. The end portion is externally provided with a produced water pipe which has a diameter of 10 mm. All the produced water pipes are communicated in parallel to a water collector port of each membrane separation device 2. The water collector ports of membrane separation devices 2 are communicated to a water collector manifold pipe which is communicated to the suction port of suction pump 6. Each membrane separation device 2 has a liquid inlet and a liquid outlet, the liquid inlet is communicated to the outlet of circulating pump 10 through the liquid supply pipe 25, and the liquid outlet is communicated to the biological reaction tank 1 through the liquid backflow pipe 26.

When the raw sewage is common municipal sewage, its main indexes of water quality are as follows: pH=6-9, $COD_{Cr}$=400-500 mg/L, $BOD_5$=100-300 mg/L, SS=100-300 mg/L, ammonia nitrogen=20-60 mg/L, TN=20-80 mg/L, TP=2-8 mg/L. For the type of sewage described above, the sewage treatment system of the invention can reach a treatment capacity of 5000 m$^3$/day. The hydraulic retention time of the biological reaction tank 1 is about 6hours, MLSS (mixed liquid suspended solids) thereof is 5-8 g/L, volume load thereof is 0.8-1.2 kg-BOD/(m$^3$·d$^{-1}$), sludge load thereof is 0.1-0.24 kg-BOD/(kg-MLSS·d$^{-1}$). The hydraulic retention time of the produced water storing tank 5 is about 2.4 h.

Figure 7:
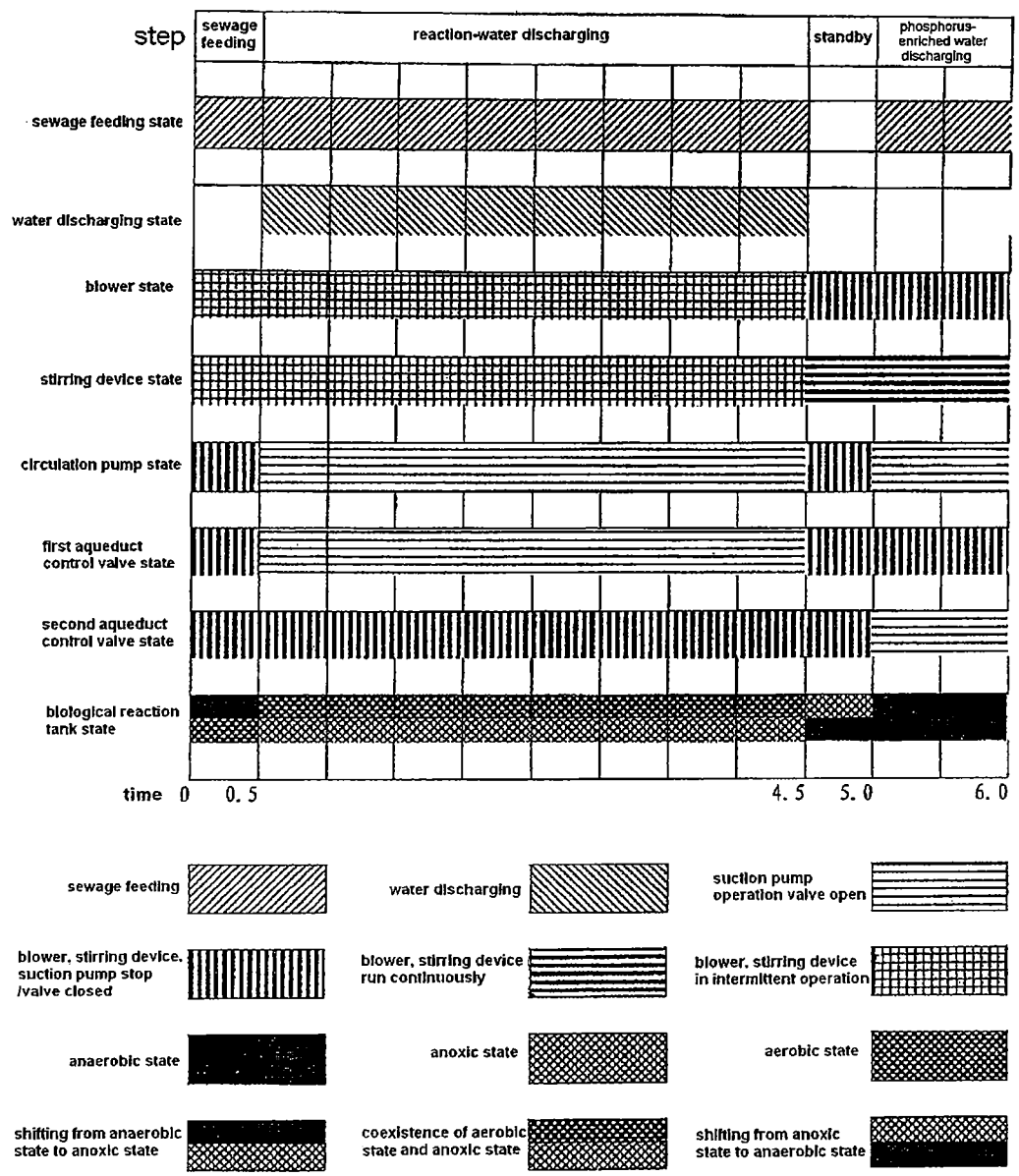
FIG. 7 illustrates a process operation schematic view of the sewage treatment process and system according to Example 2 of the present invention.

As shown in FIG. 5a and FIG. 7, the operation of the sewage treatment device of the invention is conducted via four steps: sewage feeding, reaction-water discharging, standby and phosphorus-enriched water discharging, wherein the time for the sewage feeding step is 0.5 hour, the time for the reaction-water discharging step is 4 hours, the time for the standby step is 0.5 hour, the time for the phosphorus-enriched water discharging step is 1.0 hour, and the total operation cycle is 6 hours. When the system is in the sewage feeding step and the reaction-water discharging step, the blower 7 runs intermittently to provide compressed air, and it stops for 10 min after running 20 min, the stirring device 4 starts to run during the blower 7 stopping operation to complete the liquid mixing in the biological reaction tank 1, and the stirring device 4 stops when the blower 7 starts to run. When the system is in the standby step and the phosphorus-enriched water discharging step, the blower 7 stops running while the stirring device 4 continuously runs. When the system is in the sewage feeding step, the flow rate of the fed sewage is 1000 m$^3$/h, at the end of sewage feeding step, the total sewage entered into the biological reaction tank 1 is 500 m$^3$, meanwhile, the total amount of the low-phosphorus water flows from the phosphorus recycling unit 5 back to the biological reaction tank 1 is 150 m$^3$, thus the total water amount entered into the biological reaction tank 1 in the sewage feeding step is 650 m$^3$, the water depth in the biological reaction tank 1 rises from 2.4 m to 5.0 m. Then the system proceeds into the reaction-water discharging step, a circulating pump 10 starts to run and the first aqueduct control valve 8 is open simultaneously, while the second aqueduct control calve 9 is closed. Under the effect of the positive pressure provided by the circulating pump 10, the membrane separation device 2 performs solid-liquid separation of the mixed liquid in the biological reaction tank 1 to obtain the first permeate, the first permeate flows into a produced water collecting device via the first aqueduct 11. In the reaction-treated water discharging step, sewage is continuously introduced into the biological reaction tank 1, wherein the fed water has a flow rate of 150 m$^3$/h, the total sewage amount is 600 m$^3$, and the average flow rate of the first permeate is 312.5 m$^3$/h, the total amount of the first permeate discharged from the biological reaction tank 1 and taken as the system final treated water is 1250 m$^3$. At the end of the reaction-water discharging step, the water depth in the biological reaction tank 1 drops from 5.0 m to 2.4 m. In the following standby step, no water is introduced in or discharged out of the biological reaction tank 1, the aeration stops, the stirring is carried out, and the biological reaction tank 1 changes gradually to anaerobic state. In the following phosphorus-enriched water discharging step, sewage is introduced continuously into the biological reaction tank 1 with a flow rate of 150 m$^3$/h and the stirring runs continuously, the circulating pump 10 is restarted and the second aqueduct control valve 9 is open at the same time while the first aqueduct control valve 8 is closed. Under the effect of the positive pressure provided by the circulating pump 10, the membrane separation device 2 performs solid-liquid separation of the mixed liquid in the biological reaction tank 1 to obtain the second permeate with an average flow rate of 150 m$^3$/h, the second permeate flows into the phosphorus recycling unit 5 via the second aqueduct 12. After passing through the coagulation reaction tank and the inclined plate sedimentation tank inside the phosphorus recycling unit 5, the TP concentration of the second permeate drops from 25 mg/L to 1 mg/L. In the phosphorus-enriched water discharging step, the water depth in the biological reaction tank 1 is kept 2.4 m, the total amount of the sewage entered is 150 m$^3$, the total amount of the second permeate is 150 m$^3$, and the total amount of phosphorus removed from the system in form of phosphorus chemical sediment by the phosphorus recycling unit 5 is about 3.6 kg. At this point, the sewage treatment system of the invention completes all steps of one operation cycle, and the total amount of the treated sewage is 1250 m$^3$. The sewage treatment system of the invention can run 4 complete operation cycles every day, and the treatment capacity is 5000 m$^3$/d.

After being treated by the sewage treatment device of the invention, the main indexes of the produced water are as follows: $COD_{Cr}$=20-30 mg/L, $BOD_5$=1-5 mg/L, SS=0 mg/L, TN=4-10 mg/L, TP<0.5 mg/L, and the removal rates are respectively as follows: $COD_{Cr}$≥94%, $BOD_5$≥96%, SS=100%, TN≥80%, TP≥90%.

EXAMPLE 3

Figure 4C:
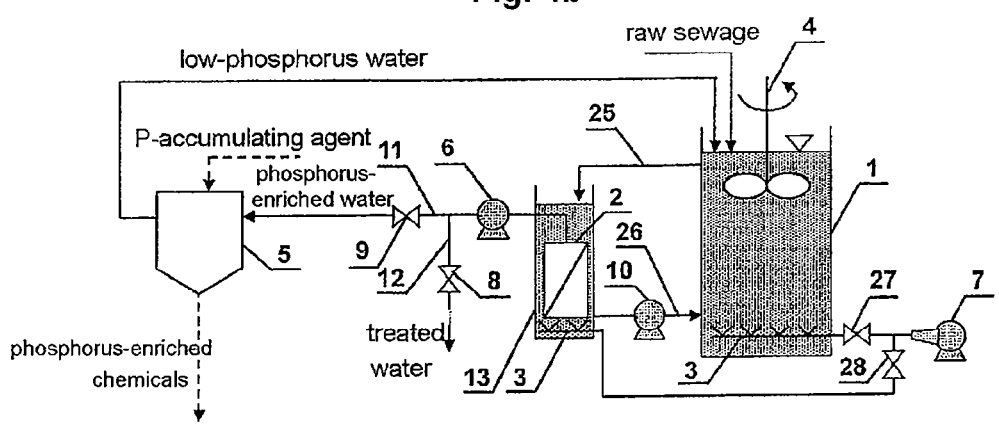
FIG. 4c illustrates a process schematic view of the sewage treatment process provided in Example 3 of the present invention.

As shown in FIG. 4c, a sewage treatment system is provided, most structures of which are the same as the Example 1, except that the membrane separation device 2 is disposed in membrane filter tank 13 which is independent from the biological reaction tank 1, and aeration device 3 are arranged in both the biological reaction tank 1 and the membrane filter tank 13, while the stirring device 4 is disposed only in the biological reaction tank 1. The biological reaction tank 1 and the membrane filter tank 13 are communicated through a liquid supply pipe 25 and a liquid backflow pipe 26, wherein a circulating pumps 10 is disposed on the liquid backflow pipe 26. There are 6 circulating pumps 10, four in use and two for backup, the flow rate of each one being 800 m$^3$/h, the pump lift thereof being 12 m, and the power thereof being 45 kW. The pipeline communicated to the gas outlet of the blower 7 is divided into two branch pipelines, one of which is communicated to the aeration device 3 in the biological reaction tank 1, and the other of which is communicated to the aeration device 3 in the membrane filter tank 13. A biological reaction tank gas supply control valve 27 and a membrane filter tank gas supply control valve 28 are arranged on the two pipelines respectively. There are 50 members of the membrane separation device 2, which are arranged in five rows each having 10 devices. The contour dimension and specification thereof are the same as that in Example 1. The internal net size of the biological reaction tank 1 is 10 m (width) ×20 m (length) ×5.6 m (depth), the effective water depth is 5 m, and the effective volume is 1000 m$^3$. The internal net size of the membrane filter tank 13 is 10 m (width) ×5 m (length) ×5.6 m (depth), the effective water depth is 5 m, and the effective volume is 250 m$^3$. The biological reaction tank 1 and the membrane filter tank 13 are constructed together to share one wall, the obtained construct has a total width of 10 m and a total length of 25 m (excluding the thickness of the shared wall). The pre-treat device at the early stage of the sewage treatment system of the present invention is the same as that of Example 1.

When the raw sewage is common municipal sewage, its main indexes of water quality are as follows: pH=6-9, $COD_{Cr}$=400-500 mg/L, $BOD_5$=100-300 mg/L, SS=100-300 mg/L, ammonia nitrogen=20-60 mg/L, TN=20-80 mg/L, TP=2-8 mg/L. For the type of sewage described above, the sewage treatment system of the invention can reach a treatment capacity of 5000 m$^3$/day. The hydraulic retention time of the biological reaction tank 1 is about 6hours, MLSS (mixed liquid suspended solids) thereof is 5-8 g/L, volume load thereof is 0.8-1.2 kg-BOD/(m$^3$·d$^{-1}$), sludge load thereof is 0.1-0.24 kg-BOD/(kg-MLSS·d$^{-1}$). The hydraulic retention time of the produced water storing tank 5 is about 2.4 h.

Figure 8:
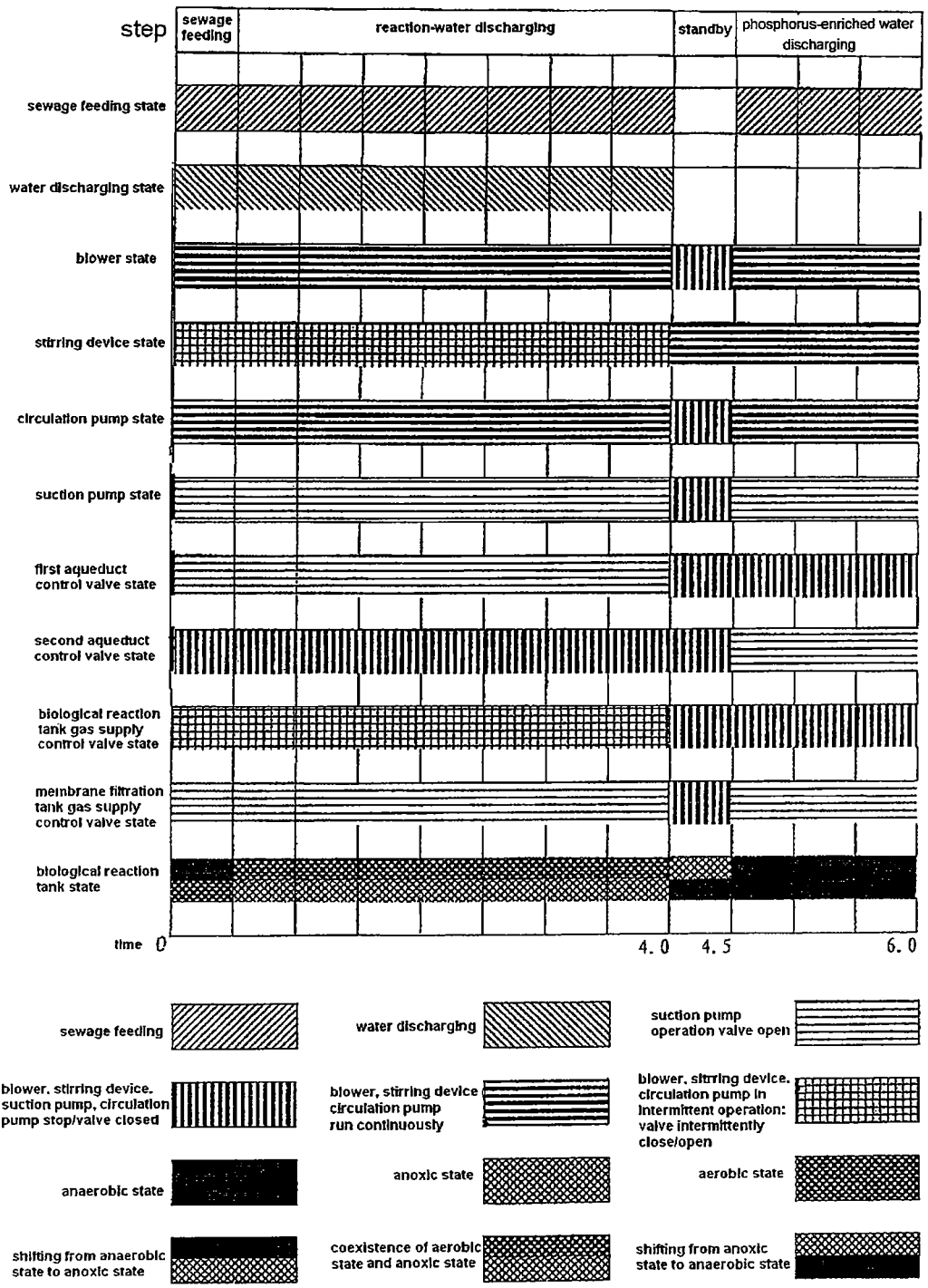
FIG. 8 illustrates a process operation schematic view of the sewage treatment process and system according to Example 3 of the present invention.

As shown in FIG. 5a and FIG. 8, the operation of the sewage treatment system of the invention is conducted via three steps: sewage feeding-reaction-water discharging, standby and phosphorus-enriched water discharging, wherein the time for the sewage feeding-reaction-water discharging step is 4 hours, the time for the standby step is 0.5 hour, the time for the phosphorus-enriched water discharging step is 1.5 hour, and the total operation cycle is 6 hours. When the system is in the sewage feeding-reaction-water discharging step, the blower 7 runs continuously to provide oxygen-rich gas with an oxygen volume concentration of 25%, and the biological reaction tank gas supply control valve 27 stops for 10 min after running 20 min, only one blower runs during the closure of the biological reaction tank gas supply control valve 27, and the stirring device 4 starts to run to complete the liquid mixing in the biological reaction tank 1, and the stirring device 4 stops when the biological reaction tank gas supply control valve 27 is open and two blowers operate together. In the sewage feeding-reaction-water discharging step, the membrane filter tank gas supply control valve 28 keeps in open state. When the system is in the standby step, the blower 7 stops to run. When the system is in the phosphorus-enriched water discharging step, the blower runs continuously to provide pure nitrogen with a nitrogen volume concentration of 95%, only one blower works and the biological reaction tank gas supply control valve 27 is keeping closed while the membrane filter tank gas supply control valve 28 is keeping open. When the system is in the standby step and the phosphorus-enriched water discharging step, the stirring device 4 runs continuously in both cases. When the system proceeds into the sewage feeding-reaction-water discharging step, the circulating pump 10 and suction pump 6 both start to run and the first aqueduct control valve 8 is open simultaneously, while the second aqueduct control calve 9 is closed. The circulating pump 10 allows the mixed liquid to circulate between the biological reaction tank 1 and the membrane filter tank 13. Under the effect of the negative pressure provided by the suction pump 6, the membrane separation device 2 performs solid-liquid separation of the mixed liquid in the membrane filter tank 13 to obtain the first permeate, the first permeate flows into a produced water collecting device via the first aqueduct 11. In the sewage feeding-reaction-water discharging step, sewage is continuously introduced into the biological reaction tank 1, wherein the fed sewage has a flow rate of 1312.5 m$^3$/h in the initial 0.5 hour, meanwhile, the low-phosphorus water discharged from the phosphorus recycling unit 5 with a total discharge amount of 150 m$^3$ flows back into the biological reaction tank 1 at this stage, the fed sewage has a flow rate of 312.5 m$^3$/h in the middle 1.0 hour, and the fed sewage has a flow rate of 52.5 m$^3$/h in the last 2.5 hour, and the total amount of the fed sewage in the sewage feeding-reaction-water discharging step is 1100 m$^3$, the average of flow rate of the first permeate is 312.5 m$^3$/h, the total amount of the first permeate discharged from the biological reaction tank 1 and taken as the system final treated water is 1250 m$^3$. The water depth in the biological reaction tank 1 rises from 2.4 m to 5.0 m in the initial 0.5 h, and keeps at 5.0 m in the middle 1.0 h, and then drops gradually from 5.0 m to 2.4 m. In the following standby step, no water is introduced in or discharged out of the biological reaction tank 1, the aeration stops, the stirring is carried out, and the biological reaction tank 1 changes gradually to anaerobic state. In the following phosphorus-enriched water discharging step, sewage is introduced continuously into the biological reaction tank 1 with a flow rate of 100 m$^3$/h and the continuous stirring is continued, the circulating pump 10 and suction pump 6 restart and the second aqueduct control valve 9 is open at the same time, while the first aqueduct control valve 8 is closed. Under the effect of the negative pressure provided by the suction pump 6, the membrane separation device 2 performs solid-liquid separation of the mixed liquid in the membrane filter tank 13 to obtain the second permeate with an average produced water flow rate of 100 m$^3$/h, the second permeate flows into the phosphorus recycling unit 5 via the second aqueduct 12. After passing through the coagulation reaction tank and the inclined plate sedimentation tank inside the phosphorus recycling unit 5, the TP concentration of the second permeate drops from 25 mg/L to 1 mg/L. In the phosphorus-enriched water discharging step, the water depth in the biological reaction tank 1 is kept 2.4 m, the total amount of the sewage entered is 150 m$^3$, the total amount of the second permeate is 150 m$^3$, and the total amount of phosphorus removed from the system in form of phosphorus chemical sediment by the phosphorus recycling unit 5 is about 3.6 kg. At this point, the sewage treatment system of the invention completes all steps of one operation cycle, and the total sewage treated is 1250 m$^3$. The sewage treatment system of the invention can run 4 complete operation cycles every day, and the treatment capacity is 5000 m$^3$/d.

After being treated by the sewage treatment device of the invention, the main indexes of the produced water are as follows: $COD_{Cr}$=20-30 mg/L, $BOD_5$=1-5 mg/L, SS=0 mg/L, TN=4-10 mg/L, TP<0.5 mg/L, and the removal rates are respectively as follows: $COD_{Cr}$≥94%, $BOD_5$≥96%, SS=100%, TN≥80%, TP≥90%.

The sewage treatment process and system provided by the invention has been described in detail above. Particular embodiments have been used to set forth the principle and implementing mode of the invention in the description. It is obvious to those skilled in the art to, based on the ideas of the invention, realize variations of the particular embodiments and applicable scopes during the implementation. Therefore, the contents recorded in the description should not be considered as limiting the invention.

What is claimed is:

1. A sewage treatment process, comprising the following steps:
    a) sewage feeding step, comprising introducing raw sewage into a biological reaction tank to a predetermined time or liquid level;
    b) reaction step, comprising performing aeration and stirring intermittently in the biological reaction tank;
    c) treated water discharging step, comprising performing solid-liquid separation of the mixed liquid in the biological reaction tank by a membrane separation device to obtain a first permeate, which is taken as the final treated water;
    d) standby step, comprising stopping aeration in the biological reaction tank; and
    e) phosphorus-enriched water discharging step, comprising keeping anaerobic condition in the biological reaction tank and performing solid-liquid separation of the mixed liquid in the biological reaction tank by a membrane separation device to obtain a second permeate, the second permeate entering inside a phosphorus recycling unit which is set independent from the biological reaction tank, the phosphorus recycling unit removing phosphorus from water, the second permeate becoming low-phosphorus water, and the low-phosphorus water flowing back to the biological reaction tank;

the sewage treatment process runs in cycle by repeating above steps.

2. The sewage treatment process according to claim 1, characterized in that the step b) and the step c) are combined to form a reaction-water discharging step: in the biological reaction tank, the aeration and stilling are performed intermittently and the first permeate is obtained by the membrane separation device and taken as the final treated water.

3. The sewage treatment process according to claim 1, characterized in that the step a), the step b) and the step c) are combined to form a sewage feeding-reaction-water discharging step: in the biological reaction tank, sewage is introduced, the aeration and stirring are performed intermittently and the first permeate is obtained by the membrane separation device and taken as the final treated water.

4. The sewage treatment process according to claim 1, characterized in that the raw sewage is pretreated prior to the step a).

5. The sewage treatment process according to claim 1, characterized in that the sludge concentration in the biological reaction tank is 2-20 g/L.

6. The sewage treatment process according to claim 1, characterized in that, in each of the steps b) to e), the raw sewage is introduced in the biological reaction tank.

7. The sewage treatment process according to claim 6, characterized in that the amount of raw sewage introduced during the steps d) and e) is 1-40% of the total amount of raw sewage introduced in the biological reaction tank during each operation cycle.

8. The sewage treatment process according to claim 1, characterized in that the step c) or the step e) is water-level dropping operation.

9. The sewage treatment process according to claim 1, characterized in that an oxygen-enriched gas with an oxygen concentration of above 25% is used as aeration medium in the step a), the step b) or the step c).

10. The sewage treatment process according to claim 1, characterized in that a pure nitrogen gas with a nitrogen concentration of above 95% is used as aeration medium in the step e).

11. A sewage treatment system, comprising a biological reaction tank, a membrane separation device, a phosphorus recycling unit set independent from the biological reaction tank and an aeration device, wherein the aeration device is in the biological reaction tank, the biological reaction tank is communicated to the membrane separation device, a water outlet of the membrane separation device is communicated to a first aqueduct and a second aqueduct, each of the first aqueduct and the second aqueduct is provided with a valve, the phosphorus recycling unit is communicated to the second aqueduct and the biological reaction tank, and a stirring device is provided in the biological reaction tank; and wherein the membrane separation device is located in the biological reaction tank to perform solid-liquid separation of the mixed liquid to obtain a second permeate, the second permeate entering inside the phosphorus recycling unit which is set independent from the biological reaction tank, wherein the biological reaction tank keep an anaerobic condition, and wherein the phosphorus recycling unit removes phosphorus from water, the second permeate becoming low-phosphorus water, and the low-phosphorus water flowing back to the biological reaction tank.

12. The sewage treatment system according to claim 11, further comprising an air separation device.

13. The sewage treatment system according to claim 11, further comprising a pre-treatment device, wherein the pre-treatment device comprises at least one of bar screen, strainer, hair collector, grit chamber, primary sedimentation tank, pH adjusting device, ion exchange device, adsorption device, flocculation sedimentation device, floatation device, hydrolysis acidification, upflow anaerobic sludge bed, expanded granular sludge bed, inter circulation reactor, normal temperature catalytic oxidation device, high temperature catalytic oxidation device, photo catalytic oxidation device, high temperature wet oxidation device, electrolytic device, microwave device.

14. The sewage treatment system according to claim 11, further comprising a post-treatment device, wherein the post-treatment device comprises at least one of chlorinating disinfection device, ultraviolet disinfection device, ozone device, biological aerated filter, constructed wetland, soil infiltration treatment system, stabilization pond, aquatic plant ponds, adsorption device, flocculation sedimentation device, flocculating filtration device, activated carbon device, ion exchange device, ultrafiltration membrane device, nanofiltration membrane device, reverse osmosis membrane device, electrodialysis device, el eletrodeionization device.

15. The sewage treatment process according to claim 5, characterized in that the sludge concentration in the biological reaction tank is preferably 4-15 g/L.

16. The sewage treatment process according to claim 6, characterized in that the sludge concentration in the biological reaction tank is more preferably 8-12 g/L.

17. The sewage treatment process according to claim 7, characterized in that the amount of raw sewage introduced during the steps d) and e) is 5-20% of the total amount of raw sewage introduced in the biological reaction tank during each operation cycle.

18. A sewage treatment system, comprising a single biological reaction tank, a membrane separation device, a phosphorus recycling unit set independent from the biological reaction tank and an aeration device, wherein the aeration device is in the biological reaction tank, the biological reaction tank is communicated to the membrane separation device, a water outlet of the membrane separation device is communicated to a first aqueduct and a second aqueduct, each of the first aqueduct and the second aqueduct is provided with a valve, the phosphorus recycling unit is communicated to the second aqueduct and the biological reaction tank, and a stirring device is provided in the biological reaction tank, and wherein a sludge/water mixture is filtered and then the filtered water is communicated to the phosphorus recycling unit, and wherein aerobic, anoxic and anaerobic environments are realized in the single biological reaction tank so as to avoid using an anaerobic phosphorous releasing tank.

\* \* \* \* \*